United States Patent
Chang et al.

(10) Patent No.: US 11,405,386 B2
(45) Date of Patent: Aug. 2, 2022

(54) ELECTRONIC DEVICE FOR AUTHENTICATING USER AND OPERATING METHOD THEREOF

(71) Applicant: Samsung Electronics Co., Ltd., Gyeonggi-do (KR)

(72) Inventors: Moonsoo Chang, Gyeonggi-do (KR); Hyungsuk Kim, Gyeonggi-do (KR); Dasom Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 421 days.

(21) Appl. No.: 16/426,150

(22) Filed: May 30, 2019

(65) Prior Publication Data

US 2019/0372969 A1 Dec. 5, 2019

(30) Foreign Application Priority Data

May 31, 2018 (KR) .................. 10-2018-0062962
Sep. 5, 2018 (KR) .................. 10-2018-0105984

(51) Int. Cl.
*H04L 9/40* (2022.01)
*G06Q 20/40* (2012.01)
(Continued)

(52) U.S. Cl.
CPC ....... *H04L 63/0861* (2013.01); *G06Q 20/401* (2013.01); *G06Q 20/40145* (2013.01);
(Continued)

(58) Field of Classification Search
None
See application file for complete search history.

(56) References Cited

U.S. PATENT DOCUMENTS 6,035,398 A    3/2000   Bjorn
6,694,025 B1    2/2004   Epstein et al.
(Continued)

FOREIGN PATENT DOCUMENTS

KR      2001-0052105 A    6/2001
KR   10-2005-0019151 A    3/2005
(Continued)

OTHER PUBLICATIONS

Dodis et al.; "Fuzzy Extractors: How to Generate Strong Keys from Biometrics and Other Noisy Data"; 2008; retrieved from the Internet https://arxiv.org/pdf/cs/0602007.pdf; pp. 1-47, as printed. (Year: 2008).*

(Continued)

*Primary Examiner* — Michael W Chao
(74) *Attorney, Agent, or Firm* — Cha & Reiter, LLC

(57) ABSTRACT

Certain embodiments of the disclosure relate to an electronic device for authenticating a user by using user's biometric information, and an operating method thereof. For example, an electronic device according to an embodiment may include: a communication circuit; a biometric sensor; and a processor operatively connected with the communication circuit and the biometric sensor, and the processor is configured to: obtain first biometric information of a user by using the biometric sensor; generate second biometric information for authenticating the user, based on concatenation of the first biometric information and unique information corresponding to the user; and transmit the second biometric information to an authentication server through the communication circuit, where the authentication server authenticates fourth biometric information by comparing the fourth biometric information to the second biometric information, and where the fourth biometric information is generated (Continued)

based on concatenation of third biometric information of the user and the unique information.

25 Claims, 23 Drawing Sheets

(51) Int. Cl.
*H04L 67/306* (2022.01)
*H04L 67/01* (2022.01)
*H04W 12/06* (2021.01)
*G06V 40/18* (2022.01)

(52) U.S. Cl.
CPC ............ *G06V 40/18* (2022.01); *H04L 63/126* (2013.01); *H04L 67/306* (2013.01); *H04L 67/42* (2013.01); *H04W 12/06* (2013.01)

(56) References Cited

U.S. PATENT DOCUMENTS

| | | | |
|---|---|---|---|
| 6,697,947 B1 * | 2/2004 | Matyas, Jr. | H04L 9/3247 713/180 |
| 7,882,363 B2 | 2/2011 | Duffy et al. | |
| 7,996,683 B2 | 8/2011 | Lyseggen et al. | |
| 8,122,260 B2 | 2/2012 | Van Der Veen et al. | |
| 8,229,177 B2 | 7/2012 | Duffy et al. | |
| 8,312,289 B2 | 11/2012 | Bruekers et al. | |
| 8,369,580 B2 | 2/2013 | Veldhuis et al. | |
| 8,410,902 B2 | 4/2013 | Kevenaar et al. | |
| 8,572,673 B2 | 10/2013 | Duffy | |
| 8,583,936 B2 | 11/2013 | Tuyls et al. | |
| 8,607,056 B2 | 12/2013 | Duffy et al. | |
| 8,625,785 B2 | 1/2014 | Nagaraja | |
| 8,959,357 B2 | 2/2015 | Baughman | |
| 8,959,364 B2 | 2/2015 | Kevenaar et al. | |
| 9,129,142 B2 | 9/2015 | Lemma et al. | |
| 9,160,522 B2 | 10/2015 | Kevenaar et al. | |
| 9,384,338 B2 | 7/2016 | Kevenaar et al. | |
| 9,467,292 B2 | 10/2016 | Nahari | |
| 9,659,297 B2 | 5/2017 | Russell et al. | |
| 9,692,603 B2 | 6/2017 | de Andrada et al. | |
| 9,716,698 B2 | 7/2017 | Abdallah et al. | |
| 9,787,648 B2 | 10/2017 | Broumas et al. | |
| 9,870,458 B2 * | 1/2018 | Jo | G06F 21/32 |
| 9,871,791 B2 | 1/2018 | Blinn | |
| 9,913,135 B2 | 3/2018 | Perold et al. | |
| 9,979,709 B2 | 5/2018 | Abdallah et al. | |
| 10,211,992 B1 * | 2/2019 | Tarandach | H04L 9/0863 |
| 10,580,164 B2 * | 3/2020 | Ramalingam | G06T 7/73 |
| 10,742,416 B2 * | 8/2020 | Polcha | H04L 9/0637 |
| 2002/0144128 A1 * | 10/2002 | Rahman | H04L 63/0838 713/186 |
| 2003/0046237 A1 | 3/2003 | Uberti | |
| 2004/0059924 A1 | 3/2004 | Soto et al. | |
| 2004/0193893 A1 * | 9/2004 | Braithwaite | G06V 40/10 713/186 |
| 2004/0210771 A1 * | 10/2004 | Wood | G06F 21/31 726/8 |
| 2005/0235148 A1 * | 10/2005 | Scheidt | G06Q 20/3829 713/168 |
| 2007/0239994 A1 | 10/2007 | Kulkarni et al. | |
| 2008/0123909 A1 | 5/2008 | Kim et al. | |
| 2008/0222496 A1 * | 9/2008 | Tuyls | H04L 9/3231 714/E11.032 |
| 2010/0231727 A1 * | 9/2010 | Steinberg | H04N 5/2171 348/207.2 |
| 2012/0167194 A1 | 6/2012 | Reese et al. | |
| 2014/0210745 A1 * | 7/2014 | Chizeck | G06F 3/048 345/173 |
| 2015/0007295 A1 | 1/2015 | Hou et al. | |
| 2015/0128285 A1 * | 5/2015 | LaFever | H04L 67/02 726/26 |
| 2015/0294313 A1 | 10/2015 | Kamal et al. | |
| 2015/0312041 A1 * | 10/2015 | Choi | G06F 21/33 713/175 |
| 2015/0356523 A1 | 12/2015 | Madden | |
| 2016/0048669 A1 * | 2/2016 | Kim | G06K 9/0061 726/19 |
| 2016/0105285 A1 * | 4/2016 | Jakobsson | H04L 9/3231 713/186 |
| 2016/0220194 A1 * | 8/2016 | Kang | A61B 5/02154 |
| 2016/0232726 A1 * | 8/2016 | Zizi | G07C 13/00 |
| 2016/0234174 A1 * | 8/2016 | Zizi | H04L 9/06 |
| 2017/0141920 A1 | 5/2017 | Herder, III et al. | |
| 2017/0148029 A1 | 5/2017 | Hu et al. | |
| 2017/0177855 A1 * | 6/2017 | Costa Faidella | H04L 9/3236 |
| 2017/0180125 A1 | 6/2017 | Bobinski | |
| 2017/0201380 A1 | 7/2017 | Schaap et al. | |
| 2017/0208464 A1 | 7/2017 | Guertler et al. | |
| 2017/0213211 A1 | 7/2017 | Sibert et al. | |
| 2017/0272432 A1 | 9/2017 | Thatte et al. | |
| 2017/0357967 A1 | 12/2017 | Sykora et al. | |
| 2018/0067600 A1 * | 3/2018 | Li | G01L 1/146 |
| 2018/0108020 A1 * | 4/2018 | Thatte | G06Q 20/206 |
| 2018/0316653 A1 * | 11/2018 | Kanza | H04L 63/0492 |
| 2019/0050546 A1 * | 2/2019 | Hochrieser | G06K 9/00288 |
| 2019/0182042 A1 * | 6/2019 | Ebrahimi | H04L 9/3231 |
| 2019/0327092 A1 * | 10/2019 | Kareti | H04L 9/3231 |
| 2020/0092102 A1 * | 3/2020 | Wang | H04L 9/3231 |
| 2020/0349247 A1 * | 11/2020 | Seo | A61B 5/0006 |
| 2022/0052852 A1 * | 2/2022 | Wang | H04L 9/3231 |

FOREIGN PATENT DOCUMENTS

| | | |
|---|---|---|
| KR | 10-2005-0083594 A | 8/2005 |
| KR | 10-0623044 B1 | 9/2006 |
| KR | 10-0734162 B1 | 7/2007 |
| KR | 10-2007-0086656 A | 8/2007 |
| KR | 10-2009-0012235 A | 2/2009 |
| KR | 10-2010-0124141 A | 11/2010 |
| KR | 10-1247914 B1 | 3/2013 |
| KR | 10-1573700 B1 | 12/2015 |
| KR | 10-1582579 B1 | 1/2016 |
| KR | 10-1622253 B1 | 5/2016 |
| KR | 10-2016-0102937 A | 8/2016 |
| KR | 10-1659226 B1 | 9/2016 |
| KR | 10-2017-0005847 A | 1/2017 |
| KR | 10-1755995 B1 | 7/2017 |
| KR | 10-1769861 B1 | 8/2017 |
| KR | 10-2018-0003113 A | 1/2018 |
| KR | 10-1860314 B1 | 5/2018 |
| WO | 03/090138 A1 | 10/2003 |

OTHER PUBLICATIONS

International Search Report dated Sep. 10, 2019.
European Search Report dated Mar. 26, 2021.
"Performance Analysis for Multi Sensor Fingerprint Recognition System", Shimon Modi et al., Purdue University, 14 pgs.
Indian Search Report dated Dec. 9, 2021.

* cited by examiner

|  | First biometric information/ Third biometric Information | Unique information corresponding to user | Concatenation | Second biometric information/ Fourth biometric Information | |
|---|---|---|---|---|---|
| First electronic device | ABC | 123 | ABC123 | az39 | ⇒ Authenticated |
| Second electronic device | ABD | 123 | ABD123 | az39 | |

FIG.16A

|  | First biometric information/ Third biometric Information | Unique information corresponding to user | Concatenation | Second biometric information/ Fourth biometric Information | |
|---|---|---|---|---|---|
| First electronic device | ABC | 123 | ABC123 | Public key | ⇒ Authenticated |
| Second electronic device | ABD | 123 | ABD123 | Signed electronically by secret key | |

FIG.16B

|  | First biometric information/ Third biometric Information | Unique information corresponding to user | Concatenation | Second biometric information/ Fourth biometric Information | |
|---|---|---|---|---|---|
| First electronic device | ABC | 123 | ABC123 | xyz986 | ⇒ Authenticated |
| Second electronic device | ABD | 123 | ABD123 | xyz987 | |

FIG.16C

|  | First biometric information/ Third biometric Information | Unique information corresponding to user | Concatenation | Second biometric information/ Fourth biometric Information | |
|---|---|---|---|---|---|
| First electronic device | ABC | 123 | ABC123 | xyz986 | ⇒ Failed |
| Second electronic device | ABZ | 123 | ABZ123 | xyz912 | |

FIG.16D

|  | First biometric information/ Third biometric Information | Unique information corresponding to user | Concatenation | Second biometric information/ Fourth biometric Information | |
|---|---|---|---|---|---|
| First electronic device | ABC | 1234567 | ABC1234567 | 8zs5 | ⇒ Authenticated |
| Second electronic device | ABD | 1234567 | ABD1234567 | 8zs5 | |

FIG.17A

|  | First biometric information/ Third biometric Information | Unique information corresponding to user | Concatenation | Second biometric information/ Fourth biometric Information | |
|---|---|---|---|---|---|
| First electronic device | ABC | 1234567 | ABC1234567 | Public key | ⇒ Authenticated |
| Second electronic device | ABD | 1234567 | ABD1234567 | Signed electronically by secret key | |

FIG.17B

|  | First biometric information/ Third biometric Information | Unique information corresponding to user | Concatenation | Second biometric information/ Fourth biometric Information | |
|---|---|---|---|---|---|
| First electronic device | ABC | 1234567 | ABC1234567 | xysab02 | ⇒ Authenticated |
| Second electronic device | ABZ | 1234567 | ABZ1234567 | xysab25 | |

FIG.17C

|  | First biometric information/ Third biometric Information | Unique information corresponding to user | Concatenation | Second biometric information/ Fourth biometric Information | |
|---|---|---|---|---|---|
| First electronic device | ABC | 1234567 | ABC1234567 | xytzm51 | ⇒ Failed |
| Second electronic device | ADZ | 1234567 | ADZ1234567 | xytzm17 | |

FIG.17D

|  | First biometric information/ Third biometric Information | Unique information corresponding to user | Concatenation | Second biometric information/ Fourth biometric Information | |
|---|---|---|---|---|---|
| First electronic device | ABC | 123 | ABC123 | az39 | ⇒Failed |
| Second electronic device | ABD | 124 | ABD124 | bx71 | |

FIG.18

ELECTRONIC DEVICE FOR AUTHENTICATING USER AND OPERATING METHOD THEREOF

CROSS-REFERENCE TO RELATED APPLICATION(S)

This application is based on and claims priorities under 35 U.S.C. § 119 to Korean Patent Application Nos. 10-2018-0062962 and 10-2018-0105984, filed on May 31, 2018 and Sep. 5, 2018, respectively, in the Korean Intellectual Property Office, the disclosures of which are herein incorporated by reference in their entireties.

BACKGROUND

Field

Certain embodiments of the disclosure generally relate to an electronic device for authenticating a user by using biometric information of the user, and an operating method thereof.

Description of Related Art

Portable electronic devices such as smartphones are no longer limited to basic services such as calling, sending messages, or the like, and can now provide various and complicated finance services such as buying and paying for products, deposit and withdrawal, remittance, or the like.

In providing these financial services, an authentication method to verify the identity of the user is typically required. This authentication method has evolved from passwords and passcodes to instead use the user's biometric information (for example, fingerprint or the like). Biometric information, compared to the traditional authentication methods such as passwords, are more secure, since it is almost impossible for others to steal biometric information.

To provide authentication using the user's biometric information, user authentication may be performed in a portable electronic device or a server. When a server is used, the server may receive the user's biometric information from the portable electronic device.

The above information is presented as background information only to assist with an understanding of the disclosure. No determination has been made, and no assertion is made, as to whether any of the above might be applicable as prior art with regard to the disclosure.

SUMMARY

In conventional biometric information-based authentication methods that do not employ a server, a disadvantage exists in that when the user uses a plurality of electronic devices, each electronic device has to individually manage biometric information.

However, when servers are employed, another disadvantage exists in that biometric information may be intercepted by hackers when the biometric information is transmitted between the server and the electronic device. Since biometric information cannot be modified or changed like passwords, this potential for interception poses a significant security risk. Accordingly, to prevent the user's biometric information from being intercepted by hackers, the electronic device may transmit encrypted or otherwise transformed biometric information to the server. However, even when the same user enters his/her own biometric information in the same electronic device, the biometric information obtained at different times may be slightly different due to minor variations in, for example, the user's fingertip or in characteristics of the electronic device. Due to these small differences in the biometric information, the biometric information may be transformed into an entirely different value when being encrypted, for example, when the biometric information is hashed. Thus, false negatives may be generated such that even when the user enters the authentic biometric information, access may be denied.

According to an embodiment of the disclosure, an electronic device may include: a communication circuit; a biometric sensor; a processor operatively connected with the communication circuit and the biometric sensor, and the processor may be configured to: obtain first biometric information of a user by using the biometric sensor; generate second biometric information for authenticating the user, based on concatenation of the first biometric information and unique information corresponding to the user; and transmit the second biometric information to an authentication server through the communication circuit, where the authentication server authenticates fourth biometric information by comparing the fourth biometric information to the second biometric information, and where the fourth biometric information is generated based on concatenation of third biometric information of the user and the unique information.

According to an embodiment of the disclosure, an electronic device may include: a communication circuit; a biometric sensor; a processor operatively connected with the communication circuit and the biometric sensor, and the processor may be configured to: receive a request for execution of a function that requires biometric authentication of a user; obtain first biometric information of the user by using the biometric sensor; generate second biometric information for authenticating the user, based on concatenation of the first biometric information and unique information corresponding to the user; transmit the second biometric information to an authentication server; receive, from the authentication server, a signal indicating that the second biometric information is authenticated with respect to fourth biometric information which is generated based on concatenation of third biometric information of the user and the unique information; and execute the function in response to the signal being received.

Additional aspects of the present disclosure will be set forth at least in part in the following description follows and, in part, will be apparent from the description, or may be learned by practice of the presented embodiments.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 16A is a table illustrating a scenario when biometric information and unique information are concatenated according to a first concatenation ratio with the same user using different devices according to an embodiment of the present disclosure;

FIG. 16B is a table illustrating another scenario when the biometric information and the unique information are concatenated according to the first concatenation ratio with the same user using different devices according to an embodiment of the present disclosure;

FIG. 16C is a table illustrating yet another scenario when the biometric information and the unique information are concatenated according to the first concatenation ratio with the same user using different devices according to an embodiment of the present disclosure;

FIG. 16D is a table illustrating still yet another scenario when the biometric information and the unique information are concatenated according to the first concatenation ratio with the same user using different devices according to an embodiment of the present disclosure;

FIG. 17A is a table illustrating a scenario when biometric information and unique information are concatenated according to a second concatenation ratio with the same user using different devices according to an embodiment of the present disclosure;

FIG. 17B is a table illustrating another scenario when the biometric information and the unique information are concatenated according to the second concatenation ratio with the same user using different devices according to an embodiment of the present disclosure;

FIG. 17C is a table illustrating yet another scenario when the biometric information and the unique information are concatenated according to the second concatenation ratio with the same user using different devices according to an embodiment of the present disclosure;

FIG. 17D is a table illustrating still yet another scenario when the biometric information and the unique information are concatenated according to the second concatenation ratio with the same user using different devices according to an embodiment of the present disclosure;

FIG. 18 is a table illustrating a case in which authentication fails when biometric information and unique information are concatenated according to the first concatenation ratio with different users using different devices according to an embodiment of the present disclosure;

Regarding the drawings, the same or similar reference numerals are used for the same or similar elements.

DETAILED DESCRIPTION

Certain embodiments of the present disclosure relate to generating biometric information which is independent from characteristics of the corresponding electronic device, and transforming the biometric information by concatenating the biometric information independent from the characteristics of the electronic device with user identification information, in order to reduce the probability of false negatives which may occur during the biometric authentication process. Since false negatives occur due to entropy of inputted biometric information, the entropy of biometric information can be increased by concatenating the inputted biometric information with user information which is not influenced by external factors. As such, the probability of false negatives occurring during the user authentication process can be reduced.

The technical objects to be achieved by the disclosure are not limited to the above-mentioned object, and other technical objects that have not been mentioned can be clearly understood by a person skilled in the art based on the following descriptions.

Hereinafter, various embodiments of this document will be described with reference to the accompanying drawings.

Figure 1:
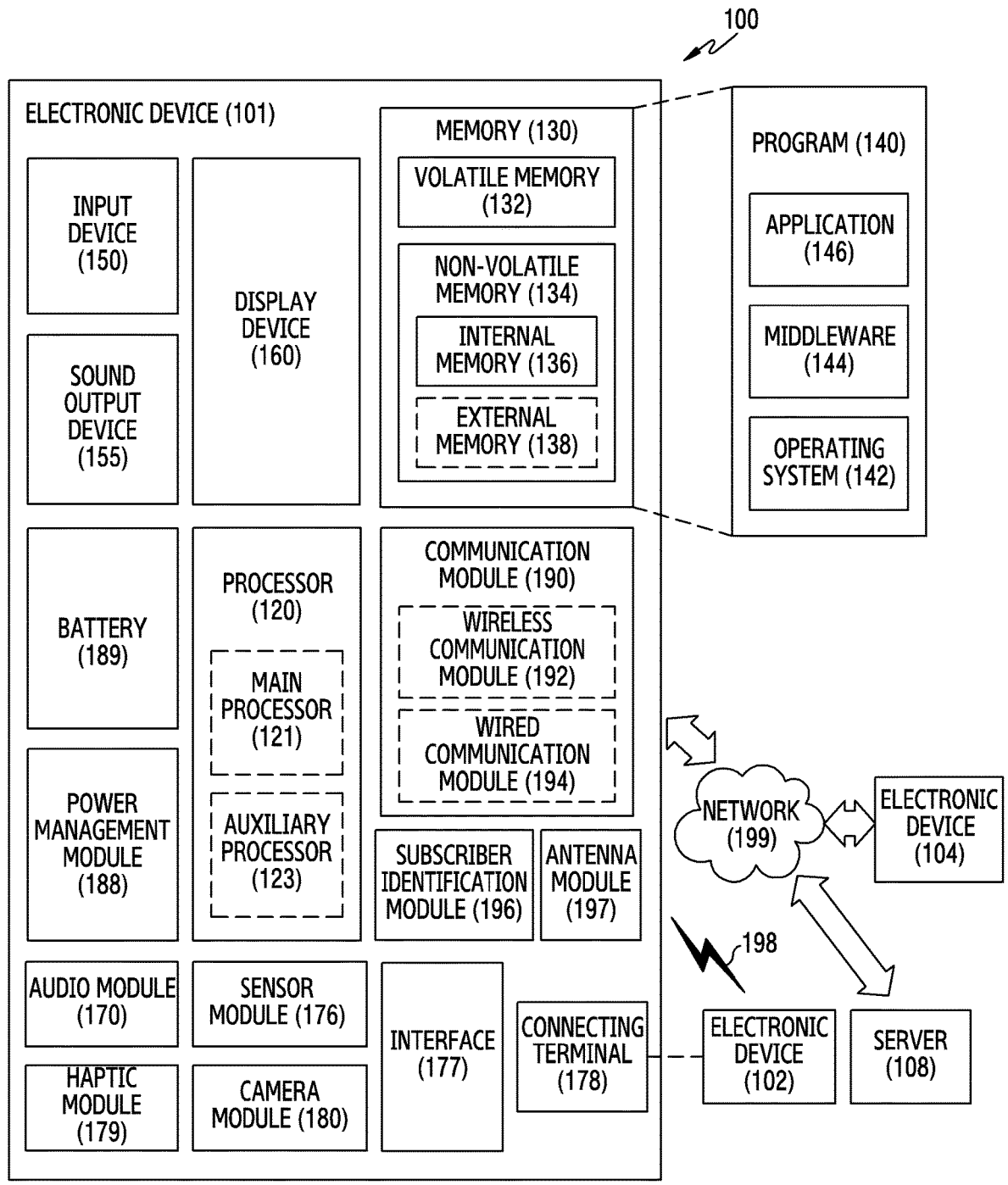
FIG. 1 is a block diagram of an electronic device in a network environment according to certain embodiments of the present disclosure.

FIG. 1 is a block diagram illustrating an electronic apparatus 101 in a network environment 100 according to certain embodiments.

Referring to FIG. 1, in the network environment 100, the electronic apparatus 101 may communicate with an electronic apparatus 102 via a first network 198 (e.g., a short-range wireless communication network) or may communicate with an electronic apparatus 104 or a server 108 via a second network 199 (e.g., a long-range wireless communication network). According to one embodiment, the electronic apparatus 101 may communicate with the electronic apparatus 104 via the server 108. According to one embodiment, the electronic apparatus 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identity module 196, or an antenna module 197. In some embodiments, at least one (e.g., the display device 160 or the camera module 180) of these components may be omitted, or one or more other components may be further included in the electronic apparatus 101. In some embodiments, some of these components may be configured as an integrated circuit. For example, the sensor module 176 (e.g., a fingerprint sensor, an iris sensor, or an illumination sensor) may be embedded in the display device 160 (e.g., a display).

The processor 120 may run, for example, software (e.g., a program 140) to control at least one other component (e.g., a hardware or software component) of the electronic apparatus 101 connected to the processor 120, and may perform various types of data processing or arithmetic operations. According to one embodiment, as at least part of the data processing or operations, the processor 120 may load a command or data received from another component (e.g., the sensor module 176 or the communication module 190) into a volatile memory 132, may process the command or data stored in the volatile memory 132, and may store the resulting data in a nonvolatile memory 134. According to one embodiment, the processor 120 may include a main processor 121 (e.g., a central processing unit or an application processor) and a coprocessor 123 (e.g., a graphics processing unit, an image signal processor, a sensor hub processor, or a communications processor) that is operable independently of or together with the main processor 121. Additionally or alternatively, the coprocessor 123 may be configured to use lower power than the main processor 121 or to specialize in a designated function. The coprocessor 123 may operate separately from the main processor 121 or as a part thereof.

The coprocessor 123 may control at least some of the functions or states associated with at least one component (e.g., the display device 160, the sensor module 176, or the communication module 190) among the components of the electronic apparatus 101, for example, instead of the main processor 121 when the main processor 121 is in an inactive (e.g., sleep) state, or along with the main processor 121 when the main processor 121 is in an active (e.g., application-running) state. According to one embodiment, the coprocessor 123 (e.g., an image signal processor or a communications processor) may be configured as a part of another functionally related component (e.g., the camera module 180 or the communication module 190).

The memory 130 may store various data used by at least one component (e.g., the processor 120 or the sensor module 176) of the electronic apparatus 101. The data may include, for example, software (e.g., the program 140), and input data or output data about a command associated with the software. The memory 130 may include a volatile memory 132 or a nonvolatile memory 134.

The program 140 may be stored as software in the memory 130 and may include, for example, an operating system 142, middleware 144, or an application 146.

The input device 150 may receive a command or data to be used for a component (e.g., the processor 120) of the electronic apparatus 101 from the outside (e.g., a user) of the electronic apparatus 101. The input device 150 may include, for example, a microphone, a mouse, or a keyboard.

The sound output device 155 may output a sound signal to the outside of the electronic apparatus 101. The sound output device 155 may include, for example, a speaker or a receiver. The speaker may be employed for general use, such as for multimedia playback or recording playback, and the receiver may be used for receiving an incoming call. According to one embodiment, the receiver may be configured separately from the speaker or as a part of the speaker.

The display device 160 may visually provide information to the outside (e.g., a user) of the electronic apparatus 101. The display device 160 may include, for example, a display, a hologram device, or a projector and a control circuit for controlling a corresponding device. According to one embodiment, the display device 160 may include touch circuitry configured to detect a touch or sensor circuitry (e.g., a pressure sensor) configured to measure the strength of force generated by a touch.

The audio module 170 may convert a sound into an electrical signal, or, conversely, an electrical signal into a sound. According to one embodiment, the audio module 170 may acquire a sound through the input device 150 or may output a sound through the audio output device 155 or an external electronic apparatus (e.g., the electronic apparatus 102 (e.g., a speaker or a headphone)) connected directly or wirelessly to the electronic apparatus 101.

The sensor module 176 may detect an operating state (e.g., power or temperature) of the electronic apparatus 101 or an external environmental condition (e.g., a user's condition) and may generate an electrical signal or a data value corresponding to the detected state or condition. According to one embodiment, the sensor module 176 may include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The interface 177 may support one or more designated protocols that can be used for the electronic apparatus 10 to be directly or wirelessly connected to an external electronic apparatus (e.g., the electronic apparatus 102). According to one embodiment, the interface 177 may include, for example, a High-Definition Multimedia Interface (HDMI), a Universal Serial Bus (USB) interface, an SD card interface, or an audio interface.

A connection terminal 178 may include a connector through which the electronic apparatus 101 can be physically connected to an external electronic apparatus (e.g., the electronic apparatus 102). According to one embodiment, the connection terminal 178 may include, for example, as an HDMI connector, a USB connector, an SD card connector, or an audio connector (e.g., a headphone connector).

The haptic module 179 may convert an electrical signal into a mechanical stimulus (e.g., vibrations or a movement) or an electrical stimulus that is perceivable by the user through a tactile sensation or the sense of movement. According to one embodiment, the haptic module 179 may include, for example, a motor, a piezoelectric element, or an electrical stimulation device.

The camera module 180 may capture a still image and a moving image. According to one embodiment, the camera module 180 may include one or more lenses, image sensors, image signal processors, or flashes.

The power management module 188 may manage the power supplied to the electronic apparatus 101. According to one embodiment, the power management module 188 may be configured, for example, as at least a part of a Power Management Integrated Circuit (PMIC).

The battery 189 may supply power to at least one component of the electronic apparatus 101. According to one embodiment, the battery 189 may include, for example, a non-rechargeable primary battery, a rechargeable secondary battery, or a fuel cell.

The communication module 190 may support establishing a direct (e.g., wired) communication channel or a wireless communication channel between the electronic apparatus 101 and an external electronic apparatus (e.g., the electronic apparatus 102, the electronic apparatus 104, or the server 108) and performing communication through the established communication channel. The communication module 190 may include one or more communication processors that operate independently of the processor 120 (e.g., an application processor) and support direct (e.g., wired) communication or wireless communication. According to one embodiment, the communication module 190 may include a wireless communication module 192 (e.g., a cellular communication module, a short-range wireless communication module, or a Global Navigation Satellite System (GNSS) communication module) or a wired communication module 194 (e.g., a Local Area Network (LAN) communication module or a power-line communication module). Among these communication modules, a corresponding communication module may communicate with an external electronic apparatus via the first network 198 (e.g., a short-range wireless communication network including a Bluetooth, Wi-Fi direct, or Infrared Data Association (IrDA) network) or the second network 199 (e.g., a long-range wireless communication network including a cellular network, the Internet, or a computer network (e.g., a LAN or WAN)). These various types of communication modules may be integrated into one component (e.g., a single chip) or may be configured as a plurality of separate components (e.g., a plurality of chips). The wireless communication module 192 may identify and authenticate the electronic apparatus 101 within a communication network, such as the first network 198 or the second network 199, using subscriber information (e.g., an International Mobile Subscriber Identity (IMSI)) stored in the subscriber identity module 196.

The antenna module 197 may transmit a signal or power to the outside (e.g., an external electronic apparatus) or may receive a signal or power from the outside. According to one embodiment, the antenna module 197 may include one or more antennas, among which at least one antenna suitable for a communication mode used for a communication network, such as the first network 198 or the second network 199, may be selected, for example, by the communication module 190. A signal or power may be transmitted or received between the communication module 190 and an external electronic apparatus via the at least one selected antenna.

At least some of the components may be connected to each other via a communication mode between peripheral devices (e.g., a bus, General-Purpose Input and Output (GPIO), Serial Peripheral Interface (SPI), or Mobile Industry Processor Interface (MIPI)) and may exchange signals (e.g., a command or data) with each other.

According to one embodiment, a command or data may be transmitted or received between the electronic apparatus 101 and the external electronic apparatus 104 via the server 108 connected to the second network 199. Each of the electronic apparatuses 102 and 104 may be a device of the same kind or a different kind from the electronic apparatus 101. According to one embodiment, all or some operations performed by the electronic apparatus 101 may be performed by one or more external electronic apparatuses among the external electronic apparatuses 102, 104, or 108. For example, when the electronic apparatus 101 needs to perform a function or a service automatically or upon request from a user or another device, the electronic apparatus 101 may, instead of or in addition to autonomously executing the function or the service, request at least one or more external electronic apparatuses to perform at least part of the function or the service. Upon receiving such a request, the one or more external electronic apparatuses may execute the at least part of the requested function or service or an additional function or service associated with the request, and may transmit the result of execution thereof to the electronic apparatus 101. The electronic apparatus 101 may provide the result, as at least part of a response to the request, without any processing or via additional processing. To this end, for example, cloud-computing, distributed-computing, or client-server-computing technologies may be used.

Figure 2:
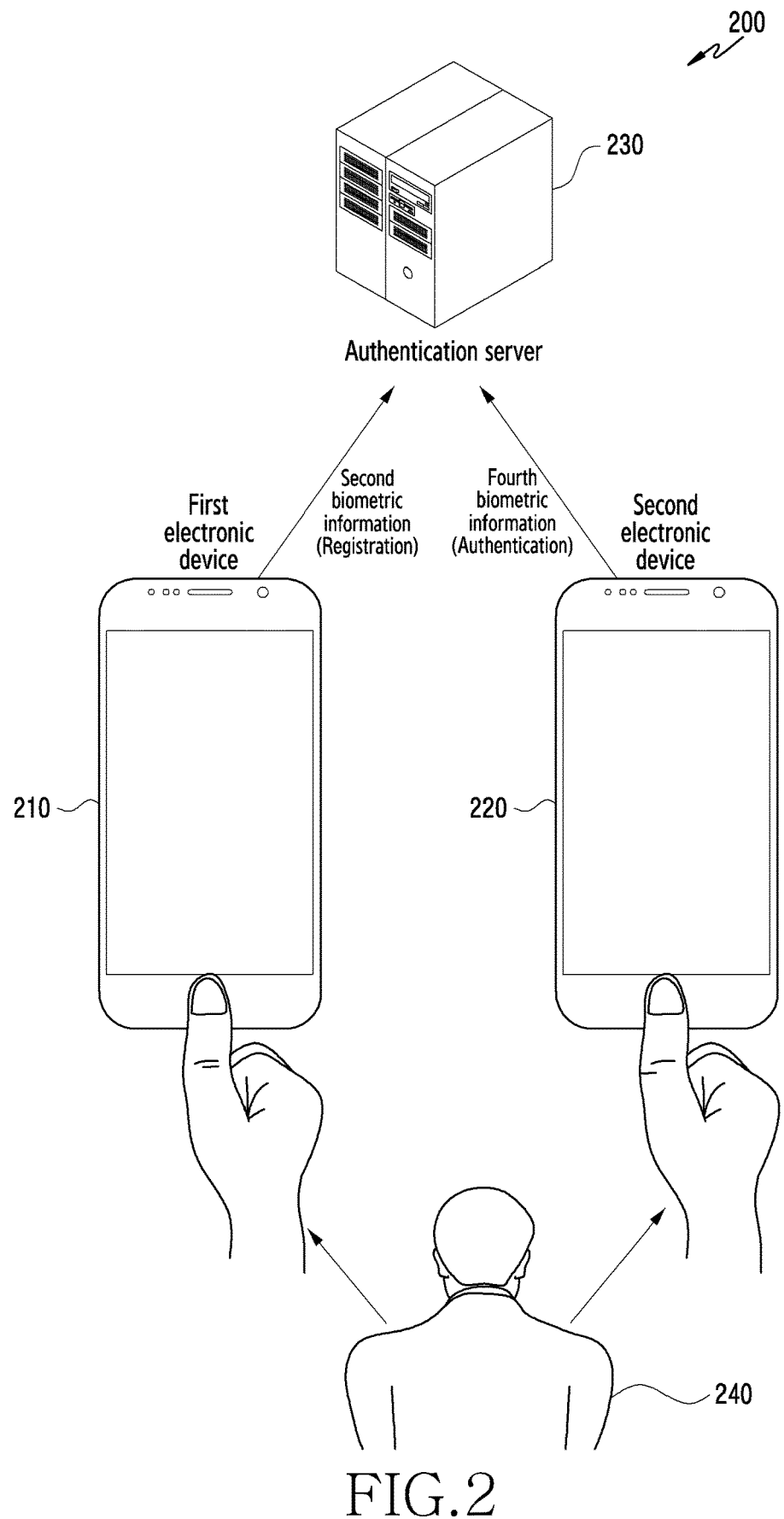
FIG. 2 is a schematic view illustrating a user authentication system using biometric information according to an embodiment of the present disclosure.

FIG. 2 is a schematic view illustrating a user authentication system using biometric information according to an embodiment of the disclosure.

Referring to FIG. 2, the user authentication system 200, which uses biometric information, may include a first electronic device 210, a second electronic device 220, and an authentication server 230 (for example, the server 108 of FIG. 1).

In an embodiment, the first electronic device 210 and the second electronic device 220 may individually be the electronic device 101 disclosed in FIG. 1.

In an embodiment, the first electronic device 210 and the second electronic device 220 may be electronic devices which are used by the same user 240.

In an embodiment, the first electronic device 210 and the second electronic device 220 may be electronic devices which are owned by the same user at a given point in time. For example, the first electronic device 210 may be a smart phone and the second electronic device 220 may be a tablet PC that are both owned by the user 240.

In another embodiment, the first electronic device 210 and the second electronic device 220 may be sequentially owned by the same user. For example, the user may replace the first electronic device 210 with the second electronic device 220 as his/her portable terminal (for example, as his/her smartphone). The user 240 may then discard the first electronic device 210 or sell the first electronic device 210 to another user.

In an embodiment, the first electronic device 210 may register biometric information of the user at the authentication server 230 in order to authenticate the user using biometric information. In an embodiment, the first electronic device 210 may associate the biometric authentication with one or more functions which may be performed by the first electronic device 210. In other words, the first electronic device 210 may be configured to perform user authentication first when being requested to execute a specific function, and to execute the specific function only when the biometric authentication is successfully completed. In another embodiment, the first electronic device 210 may perform user authentication first after receiving a request for execution of the specific function at another electronic device (for example, the second electronic device 220), and may request the authentication server 230 to execute the specific function only when the biometric authentication is successfully completed.

In an embodiment, the second electronic device 220 may transmit biometric information of the user to the authentication server 230, and may request authentication of the transmitted biometric information. In other words, the first electronic device 210 may be a device which transmits, to the authentication server 230, reference biometric information to be used for authentication of biometric information transmitted from another electronic device (for example, the second electronic device 220), and the second electronic device 220 may be a device which requests the authentication server 230 to authenticate biometric information transmitted by the second electronic device 220, based on the reference biometric information transmitted to the authentication server 230 from another electronic device (for example, the first electronic device 210).

In an embodiment, the biometric information of the user registered at the authentication server 230 from the first electronic device 210 may be different from biometric information of the user to be authenticated from the second electronic device 220. This may be due to normal and minute variations in the characteristics of the biometric information. However, since the received biometric information itself is not transmitted to the authentication server 230, but rather information that is processed based on the received biometric information (for example, feature information extracted from the received biometric information), the same biometric information may be transmitted to the authentication server 230 from the first electronic device 210 and the second electronic device 220.

Hereinafter, biometric information transmitted to the authentication server 230 from the first electronic device 210 will be referred to as second biometric information, and biometric information transmitted to the authentication server 230 from the second electronic device 220 will be referred to as fourth biometric information. Later on in the present disclosure, first biometric information will be described as biometric information used in the process of generating the second biometric information, and third biometric information will be described as biometric information used in the process of generating the fourth biometric information.

In an embodiment, the biometric information of the user may include at least one of a fingerprint image, a face image, an iris image, and voice data.

In an embodiment, the authentication server 230 may be a device which authenticates the fourth biometric information received from the second electronic device 220, based on the second biometric information received from the first electronic device 210. The authentication server 230 may store the second biometric information received from the first electronic device 210 in a storage of the authentication server 230. The authentication server may map the second biometric information received from the first electronic device 210 onto unique information of the user (or information pairing with the unique information of the user), or account information of the user, and may store the mapped information in the storage of the authentication server 230. After storing the second biometric information, the authentication server 230 may receive the fourth biometric information, and may authenticate the fourth biometric information by comparing the received fourth biometric information and the second biometric information. The authentication server 230 may authenticate the fourth biometric information based on the result of comparing the fourth biometric information and the second biometric information. The authentication server 230 may determine that the fourth biometric information is successfully authenticated only when the fourth biometric information and the second biometric information have the same value, or may determine that the fourth biometric information is successfully authenticated only when a difference between the fourth biometric information and the second biometric information falls within a predetermined range. The authentication server 230 may transmit the result of authenticating the fourth biometric information to the second electronic device 220.

In an embodiment, the authentication server 230 may respond to a specific function. The specific function may refer to a function of a particular application. For example, when biometric authentication for execution of a messenger application is required, the first electronic device 210 may transmit the second biometric information to a first authentication server corresponding to the messenger application. In another example, when biometric authentication for execution of a financial application is required, the first electronic device 210 may transmit the second biometric information to a second authentication server corresponding to the financial application.

In another embodiment, the specific function may refer to a command of a particular application. For example, when biometric authentication for logging into a bank application is required, the first electronic device 210 may transmit the second biometric information for logging into the first authentication server, which occurs when logging into the bank application. In another example, when biometric authentication for remittance in the bank application is required, the first electronic device 210 may transmit the second biometric information for remitting to the second authentication server, which occurs for remittances in the bank application. Since the logging on and the remittance are all functions in the same bank application, the first electronic device 210 may transmit the second biometric information for logging on and the second biometric information for remitting to an authentication server corresponding to the bank application.

Figure 3:
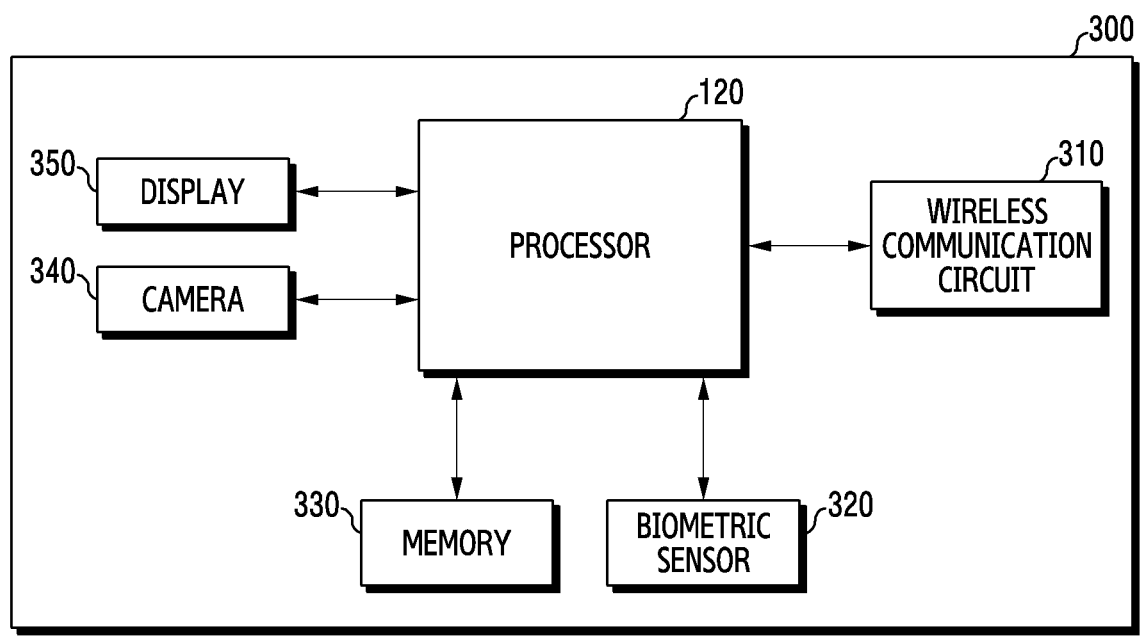
FIG. 3 is a block diagram of an electronic device according to an embodiment of the present disclosure.

FIG. 3 is a block diagram of an electronic device according to an embodiment of the disclosure.

In an embodiment, the electronic device 300 may be the first electronic device 210 of FIG. 2 or the second electronic device 220 of FIG. 2.

In an embodiment, the electronic device 300 may include a wireless communication circuit 310, a biometric sensor 320 (for example, the sensor module 176 of FIG. 1), a memory 330 (for example, the memory 130 of FIG. 1), a camera 340 (for example, the camera module 180 of FIG. 1), a display 350 (for example, the display device 160 of FIG. 1), or a processor 120.

In an embodiment, the wireless communication circuit 310 may be used to transmit and receive data between the electronic device 300 and an external device (for example, the authentication server 230 of FIG. 2). For example, the wireless communication circuit 310 may include a communication module (for example, the communication module 190 of FIG. 1) or may be at least part of the communication module 190. In an embodiment, the electronic device 300 may transmit data generated or stored in the electronic device 300 to an external device, and may receive a command or data from the external device, by using the wireless communication circuit 310. For example, the first electronic device 210 may generate second biometric information to be transmitted to an authentication server (for example, the authentication server 230 of FIG. 2), and may transmit the generated second biometric information to the authentication server 230 by using the wireless communication circuit 310. In another example, the second electronic device 220 may transmit fourth biometric information to be transmitted to the authentication server 230 to the authentication server 230, and then may receive, from the authentication server 230, a message indicating that the fourth biometric information is successfully authenticated, by using the wireless communication circuit 310.

In an embodiment, the biometric sensor 320 may sense (or obtain) biometric information of the user. In an embodiment, the biometric sensor 320 may include at least one of a fingerprint sensor, a face recognition sensor, an iris sensor, and a microphone. For example, the fingerprint sensor may obtain or detect a fingerprint image of the user and capture it as biometric information of the user.

In an embodiment, the camera 340 may obtain an image of the external environment of the electronic device 300. For example, based on manipulations by the user, the camera 340 may obtain an image of the user's identification (ID) card, which includes unique identification information of the user.

In an embodiment, the display 350 may visually provide information to be viewable from outside the electronic device. For example, when the second electronic device 220 receives, from the authentication server 230, information indicating that authentication of the fourth biometric information is successfully completed, the second electronic device 220 may display the message indicating that the authentication of the fourth biometric information is successfully completed through the display 350.

In an embodiment, the memory 330 may store command (s) regarding operation(s) or function(s) to be performed by the electronic device 300, data generated in the electronic device, and/or data to be displayed (for example, to the user) or transmitted to an external device (for example, the authentication server 230). For example, the memory 330 may store biometric information of the user obtained through the biometric sensor 320, process the biometric information into the first biometric information or second biometric information, and/or store the first biometric information or second biometric information.

In an embodiment, the processor 120 may control the overall operation of the electronic device 300. For example, the processor 120 may generate or obtain the first biometric information as device-independent biometric information, based on the biometric information of the user obtained through the biometric sensor 320. In another example, as described below, the processor 120 may generate or obtain the second biometric information based on concatenation of the first biometric information and the unique information corresponding to the user.

Figure 4:
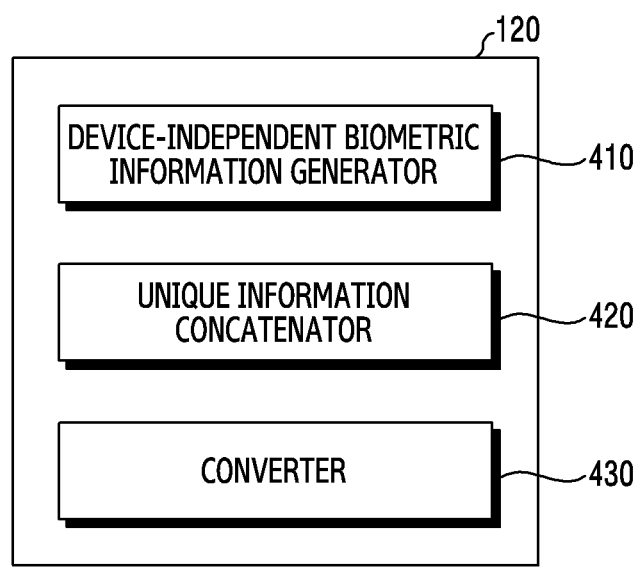
FIG. 4 is a block diagram of a processor according to an embodiment of the present disclosure.

FIG. 4 is a block diagram of a processor according to an embodiment of the disclosure.

Referring to FIG. 4, the processor 120 may include a device-independent biometric information generator 410, a unique information concatenator 420, and a converter 430. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

The device-independent biometric information generator 410 may generate device-independent biometric information based on biometric information of the user received through a biometric sensor (for example, the biometric sensor 320 of FIG. 3). The device-independent biometric information may be biometric information from which deviations in the information caused by hardware or software specifications of the biometric sensors 320 included in the electronic device (for example, the electronic device 300 of FIG. 3), is removed. Hereinafter, the device-independent biometric information may be referred to as the first biometric information or third biometric information.

In an embodiment, the device-independent biometric information generator may communicate with an external server to remove deviations in the biometric information of the user according to the biometric sensor 320. For example, the device-independent biometric information generator may receive data for removing the deviation according to the biometric sensor 320 from a device independent (DI) server.

In another embodiment, the device-independent biometric information generator may receive data for removing the deviation according to the biometric sensor 320 from a memory.

The unique information concatenator 420 may concatenate the first biometric information (or third biometric information) with unique information (identity information) corresponding to the user. In an embodiment, the unique information corresponding to the user may be the name or sex of the user, or information that can identify the user (for example, a resident registration number in Korea, or a social security number in U.S.). In an embodiment, the unique information corresponding to the user may be information of an image which is obtained by photographing a physical object (for example, a resident registration certificate in Korea, or a driver's license in U.S.) containing information for identifying the user. The unique information corresponding to the user may be referred to as a digital ID.

In an embodiment, the unique information concatenator 420 may communicate with an external server to obtain unique information corresponding to the user. For example, the unique information concatenator 420 may obtain unique information corresponding to the user from an identification (ID) server. The unique information concatenator may transmit information of a subscriber identity module (SIM) card installed (or mounted) in the electronic device 300 to the ID server, and may receive unique information of the user corresponding to the SIM card from the ID server.

In an embodiment, the unique information concatenator 420 may concatenate the information obtained from the ID server with the first biometric information (or third biometric information). To do so, the unique information concatenator 420 may extract a feature value from the information obtained from the ID server and may combine the extracted feature value with the first biometric information. In another embodiment, the unique information concatenator 420 may receive, from the ID server, the feature value extracted from the unique information of the user.

The converter 430 may generate information that a first electronic device (for example, the first electronic device 210 of FIG. 2) will transmit to an authentication server (for example, the authentication server 230 of FIG. 2). To do so, the converter 430 may transform the concatenated information of the first biometric information and the unique information corresponding to the user. The information that the first electronic device 210 will transmit to the authentication server 230 may be referred to as second biometric information. The converter 430 may also generate information that a second electronic device (for example, the second electronic device 220 of FIG. 2) will transmit to the authentication server 230 by transforming the concatenated information of the third biometric information and the unique information corresponding to the user. The information that the second electronic device 220 will transmit to the authentication server 230 may be referred to as fourth biometric information.

In an embodiment, the converter 430 may generate the second biometric information by performing one-way transform with respect to the concatenated information. For example, the one-way transform may include bio-hashing or key extraction methods.

In an embodiment, the converter 430 may generate a unique biometric feature value or a unique key as the second biometric information by performing one-way transform with respect to the concatenated information. When the unique key is generated as the second biometric information, a public key/unique key algorithm may be used.

Figure 5:
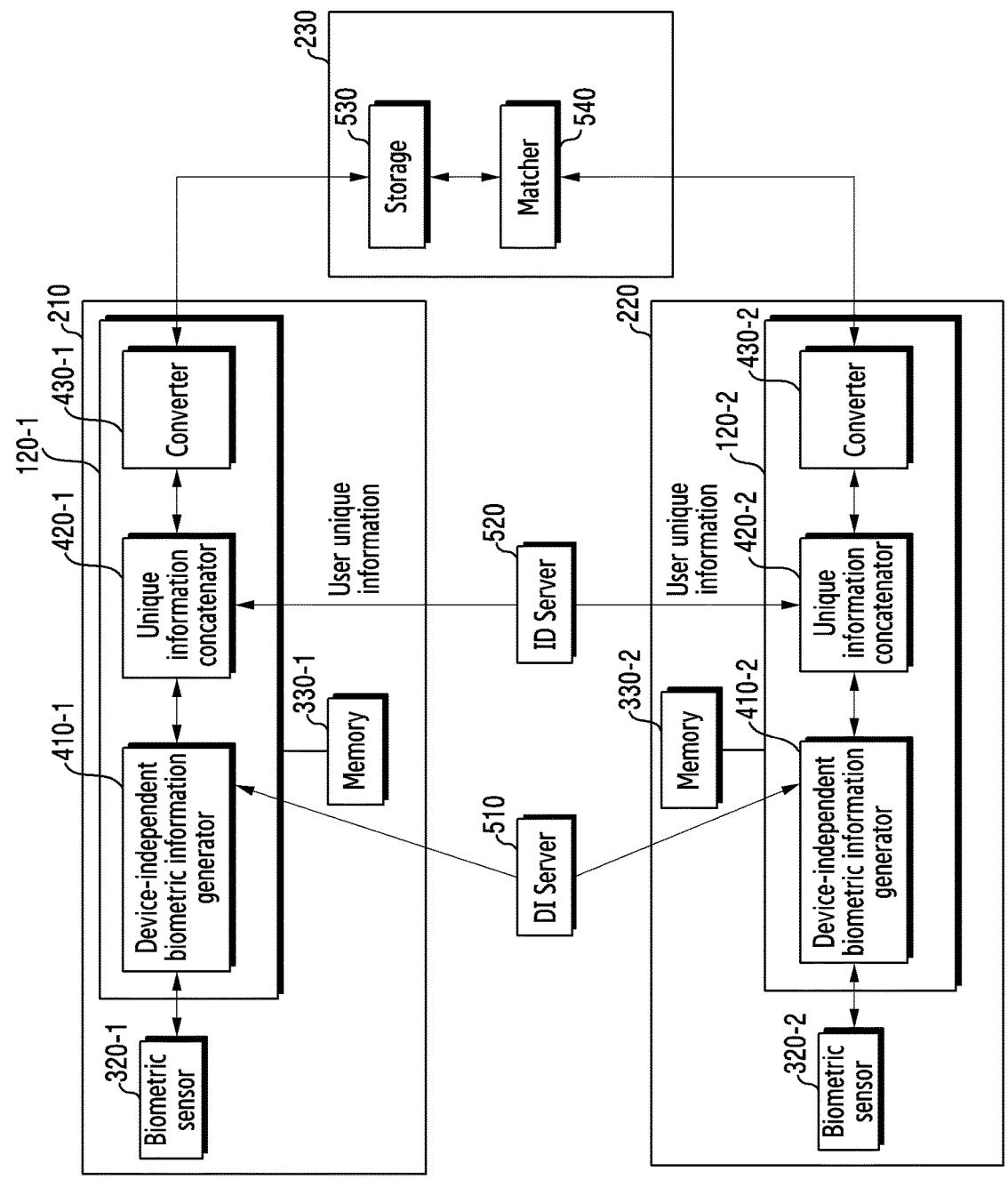
FIG. 5 is a block diagram illustrating data flows between a first electronic device, a second electronic device, and an authentication server according to an embodiment of the present disclosure.

FIG. 5 is a block diagram illustrating data flows between a first electronic device, a second electronic device, and an authentication server according to an embodiment of the disclosure.

Referring to FIG. 5, a user authentication method using biometric information according to an embodiment of the disclosure may be divided into a registering process and an authentication process. The registering process may be performed between a first electronic device (for example, the first electronic device 210 of FIG. 2) and an authentication server (for example, the authentication server 230 of FIG. 3), and the authentication process may be performed between a second electronic device (for example, the second electronic device 220 of FIG. 2) and the authentication server 230. As described above, the registering process and the authentication process may be performed by the same user but using different devices (for example, the first electronic device 210 versus the second electronic device 220). Hereinafter, the registering process and the authentication process will be separately described. In the description related to FIG. 5, indices 1 and 2 are added to reference numerals for respective elements included in the first electronic device 210 and the second electronic device 220 to distinguish the elements. For example, reference numeral 320-1 may be assigned to a biometric sensor of the first electronic device 210, and reference numerals 320-2 may be assigned to a biometric sensor of the second electronic device 220.

The registering process may be initiated or triggered by an input of the user of the first electronic device 210. The input of the user may be associated with a specific function of the first electronic device 210. For example, the first electronic device 210 may receive a user input for requesting execution of the specific function. In another example, the first electronic device 210 may receive a user input to set up the biometric authentication with the specific function. That is, the first electronic device 210 may request biometric authentication when execution of the specific function is requested, and may execute the specific function only when the biometric authentication is successfully completed.

In an embodiment, biometric information of the user registered in the registering process may correspond to the specific function. For example, biometric information registered at the authentication server 230 in response to a first function may be different from biometric information registered at the authentication server 230 in response to a second function. That is, the biometric information may be generated in different ways or generated based on different concatenation ratios. In another example, biometric information for the first function may be stored in a first authentication server corresponding to the first function, and biometric information for the second function may be stored in a second authentication server corresponding to the second function.

In an embodiment, the execution of the specific function may refer to execution of an individual application (for example, a shopping application, a cloud application, or the like) installed in the electronic device, or may refer to execution of one command (for example, payment in the shopping application) of a particular executing application installed in the electronic device. For example, the first electronic device 210 may initiate the registering process of biometric information in response to reception of a user input unlocking the electronic device, when the electronic device is in a locking mode (for example, a sleep mode including a power saving mode, a display locking mode, or the like). In another example, the first electronic device 210 may initiate the registering process of the biometric information in response to reception of a user input for requesting execution of a shopping application.

In an embodiment, the first electronic device 210 may receive a user input for determining a property (or characteristic) of biometric authentication for the specific function. As described below, the property of the biometric authentication may be changed according to a concatenation ratio of the first biometric information and the unique information corresponding to the user. For example, when the relative ratio of the first biometric information increases, biometric authentication may depend more heavily on the biometric information. In another example, when the relative ratio of the unique information corresponding to the user increases, biometric authentication may depend more heavily on the unique information of the user. The first electronic device 210 may receive a user input indicating which of the biometric information and the unique information is to be more heavily relied upon. For example, the first electronic device 210 may receive a user input for requesting setting of biometric authentication considering only 100% biometric information with respect to a payment function of a shopping application. In another example, the first electronic device 210 may receive a user input for requesting setting of biometric authentication by reflecting biometric information by about 80%, and by reflecting unique information corresponding to the user by about 20% with respect to execution of the shopping application. In another embodiment, the first electronic device 210 may concatenate the first biometric information and the unique information corresponding to the user according to a default concatenation ratio (for example, 5:5) regardless of a user input.

In an embodiment, the registering process may be initiated by the first electronic device 210 as part of the setup process for the electronic device. For example, the registering process may be initiated when the first electronic device 210 is initially set up by the user out of the box.

In an embodiment, in response to a user input associated with a specific function being received, the first electronic device 210 may receive biometric information of the user through the biometric sensor 320-1. The first electronic device 210 may activate the biometric sensor 320-1, which at that time may be deactivated, and may output a message informing that the first electronic device 210 is ready to obtain biometric information of the user.

In an embodiment, the biometric information of the user received through the biometric sensor 320-1 may be transmitted to a processor 120-1 or a device-independent biometric information generator 410-1, which is part of the processor 120-1. The processor 120-1 or the device-independent biometric information generator 410-1 may receive data for removing variations in the biometric information caused by the sensor 320-1 from a DI server 510.

In an embodiment, the DI server 510 may be connected with a plurality of client devices. The DI server 510 may receive a data request for calibrating biometric information from at least one client device, and may provide requested data in response to the data request being received. Herein, calibrating biometric information may refer to removing deviations caused by device-specific characteristics of biometric sensors included in the client devices. The DI server 510 may include a database which stores data mapped onto the plurality of client devices or biometric sensors included in the plurality of client devices. This data may include parameter data for removing deviations caused by device-specific characteristics (that is, hardware or software specifications) of each biometric sensor.

In an embodiment, the device-independent biometric information generator 410-1 may generate first biometric information as device-independent biometric information, by using the biometric information of the user received from the biometric sensor 320-1 and the data received from the DI server 510. The device-independent biometric information generator 410-1 may generate the first biometric information by applying the data received from the DI server 510 to the biometric information of the user received from the biometric sensor 320-1. The first biometric information generated in the device-independent biometric information generator 410-1 may be transmitted to the unique information concatenator 420-1.

In an embodiment, the unique information concatenator 420-1 may concatenate the first biometric information and unique information corresponding to the user. The unique information concatenator 420-1 may obtain unique information corresponding to the user from an ID server 520. In an embodiment, the unique information concatenator 420-1 may obtain the unique information corresponding to the user itself from the ID server 520, and/or may receive a feature value extracted from the unique information corresponding to the user from the ID server 520. For example, the unique information concatenator 420-1 may obtain, from the ID server 520, random bit (or random number) information generated by using the unique information corresponding to the user as a seed. When the unique information corresponding to the user itself is obtained from the ID server 520, the unique information concatenator 420-1 may extract a feature value from the obtained information.

The unique information concatenator 420-1 may transmit a signal for requesting unique information from the ID server 520 prior to obtaining the unique information. The signal for requesting the unique information may include at least one of information related to a subscriber identity module installed in the first electronic device 210, and an image (for example, an image of a physical ID card) stored in a memory 330-1.

The unique information concatenator 420-1 may transmit the concatenated information of the first biometric information and the unique information to a converter 430-1.

In an embodiment, the ID server 520 may be connected with a plurality of client devices. The ID server 520 may receive, from at least one client device, a request for unique information corresponding to the user of the client device, and may provide the requested information in response to the request. In an embodiment, the request for the unique information may include information of a SIM card installed at the client device. For example, the ID server 520 may be a communication service operator server which is managed by a telecommunications business operator.

In an embodiment, the reason to concatenate the first biometric information with the unique information corresponding to the user is that false acceptance in biometric authentication essentially depends on entropy of the biometric information inputted for biometric authentication. As the entropy of the biometric information inputted for biometric authentication decreases, the false acceptance rate of biometric authentication may increase. Accordingly, when information that is not externally influenced (for example, the unique information corresponding to the user) is concatenated with the biometric information used for the biometric authentication, the entropy of the biometric information can be increased, and as a result, the false acceptance rate of the biometric authentication can be reduced.

In an embodiment, the converter 430-1 may generate second biometric information to be transmitted to the authentication server 230 by transforming the concatenated information of the first biometric information and the unique information corresponding to the user. The converter 430-1 may generate a unique biometric feature value or a unique key by performing one-way transform with respect to the concatenated information. In an embodiment, when the converter 430-1 generates the unique key, hint data may be generated at the same time. In an embodiment, the hint data generated in the registering process may be used as base data in restoring the same key in the authentication process.

In an embodiment, the second biometric information generated by the converter 430-1 may be transmitted to the authentication server 230. The hint data may be additionally transmitted to the authentication server 230 according to the generation method of the second biometric information. In an embodiment, account information of the user may be additionally transmitted to the authentication server 230. The account information of the user may be transmitted to the authentication server 230 separately from the second biometric information (or hint data). For example, the account information of the user may be transmitted to the authentication server 230 before the biometric information is received through the biometric sensor.

In an embodiment, the second biometric information may be stored in a storage 530 of the authentication server 230. The second biometric information may be mapped onto the unique information of the user (or information corresponding to the unique information of the user), or the account information of the user, and may be stored in the storage 530 of the authentication server 230. The second biometric information may be mapped onto the specific function associated with the registering process in addition to the unique information of the user, and may be stored in the storage 530 of the authentication server 230. The second biometric information may be mapped onto information regarding the concatenation ratio related to the second biometric information (for example, the ratio used in the process of generating the second biometric information), in addition to the unique information of the user, and may be stored in the storage 530 of the authentication server 230. The second biometric information stored in the storage 530 may be provided to a matching unit 540 to determine whether fourth biometric information transmitted from the second electronic device 220 is authenticated.

The authentication process may be initiated or triggered by an input of a user using the second electronic device 220. The second electronic device 220 may be initiated or triggered by a user input associated with a specific function. For example, the second electronic device 220 may receive a user input for executing a shopping application or a cloud-based application. More specifically, the second electronic device 220 may receive a user input for requesting payment of a specific product in the executed shopping application, or may receive a user input for requesting downloading of data stored in a cloud server in the executed cloud application.

In an embodiment, the second electronic device 220 receiving the user input may try to connect to an external server (for example, the authentication server 230) corresponding to the specific function. The second electronic device 220 may transmit user account information corresponding to the user of the second electronic device 220 to the authentication server 230. For example, the second electronic device 220 receiving the user input for executing the shopping application may try to connect to the authentication server 230 corresponding to the execution of the shopping application in order to display an initial screen or an initial user interface of the shopping application.

In an embodiment, the second electronic device 220 receiving the user input may try to connect to an external server (or the authentication server 230) corresponding to the specific function, and may be requested to perform biometric authentication first by the external server (or authentication server 230). For example, the authentication server 230 may identify that biometric authentication is set to be required for the execution of the specific function from the first electronic device 210, and may transmit a message requesting the second electronic device 220 perform biometric information first.

In an embodiment, the message that the authentication server 230 transmits to the second electronic device 220 may include information regarding the concatenation ratio between the biometric information and the unique information corresponding to the user. For example, the authentication server 230 may identify information regarding the concatenation ratio that corresponds to the specific function and the user account information from the storage 530 of the authentication server 230, and may transmit the identified information to the second electronic device 220.

In an embodiment, the concatenation ratio between the biometric information and the unique information corresponding to the user may already be determined in the registering process. The concatenation ratio between the biometric information and the unique information corresponding to the user may be determined based on a user input in the registering process, or may be determined based on an attribute of the specific function.

In an embodiment, the second electronic device 220 may receive biometric information of the user through the biometric sensor 320-2 in response to the message for requesting performance of biometric authentication, which is received from the authentication server 230. In another embodiment, the second electronic device 220 may obtain the biometric information of the user from a memory 330-2. For example, the information stored in the memory 330-2 may include biometric information which is used for internal authentication of the second electronic device 220 (for example, authentication for unlocking the second electronic device 220, etc.). Alternatively, the second electronic device 220 may compare the biometric information of the user received through the biometric sensor, and the biometric information stored in the memory 330-2, and, when the difference between the information falls within a specified range, the second electronic device 220 may provide the information stored in the memory 330-2 (that is, the biometric information used for internal authentication of the second electronic device 220) to a device-independent biometric information generator 410-2.

In an embodiment, the device-independent biometric information generator 410-2 may generate third biometric information as device-independent biometric information by using the biometric information of the user received from the biometric sensor 320-2 and data received from the DI server 510.

In an embodiment, the unique information concatenator 420-2 may concatenate the third biometric information and unique information corresponding to the user.

In an embodiment, a converter 430-2 may generate fourth biometric information to be transmitted to the authentication server 230, by transforming the concatenated information of the third biometric information and the unique information corresponding to the user. The converter 430-2 may generate a unique biometric feature value or a unique key by performing one-way transform with respect to the concatenated information. In an embodiment, the converter 430-2 may receive hint data corresponding to the user from the authentication server 230 prior to generating the fourth generic information. The converter 430-2 may generate the fourth biometric information to be transmitted to the authentication server 230 more rapidly by using the received hint data.

In an embodiment, the converter 430-2 may transmit the fourth biometric information to the authentication server 230. For example, when the converter 430-2 generates the unique biometric feature value as the fourth biometric information, the converter 430-2 may transmit the unique biometric feature value to the authentication server 230. In another example, the converter 430-2 may derive a public key and a unique key from the unique biometric feature value, and may transmit information electronically signed by using the unique key to the authentication server 230.

In an embodiment, the authentication server 230 which receives the fourth biometric information may determine whether the fourth biometric information is authenticated by using the second biometric information. Thus, the authentication server 230 may authenticate the fourth biometric information with respect to the second biometric information. In an embodiment, the authentication server 230 may authenticate the fourth biometric information based on the result of comparing the second biometric information and the fourth biometric information. For example, the authentication server 230 may determine that the fourth biometric information is successfully authenticated with respect to the second biometric information only when the fourth biometric information is the same as the second biometric information. In another example, the authentication server 230 may determine that the fourth biometric information is successfully authenticated with respect to the second biometric information only when the difference between the fourth biometric information and the second biometric information falls within a specified range.

Figure 6:
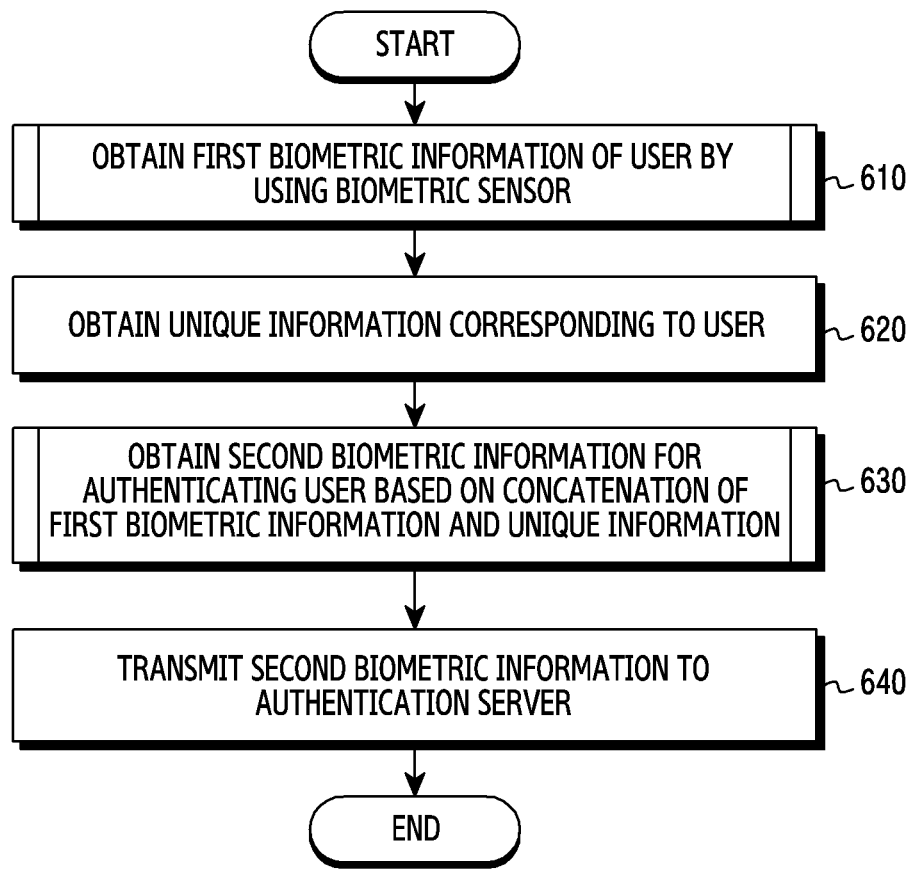
FIG. 6 is a flowchart illustrating a method for registering biometric information at the authentication server by the first electronic device according to an embodiment of the present disclosure.

FIG. 6 is a flowchart illustrating a method for registering biometric information at an authentication server by a first electronic device according to an embodiment of the disclosure.

Operations disclosed in FIG. 6 may be performed by a first electronic device (for example, the first electronic device 210) or a processor of the first electronic device (for example, the processor 120-1). Hereinafter, it will be described that the operations disclosed in FIG. 6 are performed by the first electronic device 210.

The operations disclosed in FIG. 6 may be performed on a specified region of the processor dedicated for software security.

In operation 610, the first electronic device 210 may obtain first biometric information of a user by using a biometric sensor (for example, the biometric sensor 320-1 of FIG. 3). In an embodiment, the first biometric information may be user's biometric information which is received through the biometric sensor 320-1 and from which deviations caused by the sensor is removed.

The first electronic device 210 may receive a user input associated with a specific function prior to obtaining the first biometric information. For example, when a request for execution of the specific function is received, the first electronic device 210 may request biometric authentication, and may perform the specific function only when the biometric authentication is successfully completed. To accept biometric information, the first electronic device 210 may activate the biometric sensor 320-1, if it is deactivated at the time, and may output a message saying "Place your thumb on the fingerprint sensor" on the display.

In operation 620, the first electronic device 210 may obtain unique information corresponding to the user. In an embodiment, the first electronic device 210 may provide information of the SIM card installed at the first electronic device 210 to an ID server, and may obtain the unique information of the user corresponding to the SIM card from the ID server (for example, the ID server 520 of FIG. 5). For example, the unique information may be the name, resident registration number, sex, age, etc. of the user corresponding to the SIM card. In another embodiment, the first electronic device may obtain the unique information corresponding to the user, based on information obtained by using a sensor. For example, the first electronic device may photograph a physical ID card including unique identification information of the user with a camera, and may obtain the unique information of the user by using the photographed image. For example, the first electronic device may obtain the unique information corresponding to the user from the photographed image by using an optical character recognition (OCR) technique. In still another embodiment, the first electronic device may obtain the unique information corresponding to the user by using information related to an IP address of the first electronic device.

In operation 630, the first electronic device 210 may obtain second biometric information for authenticating the user, based on concatenation of the first biometric information and the unique information (or a feature value extracted from the unique information). In an embodiment, the first electronic device 210 may concatenate the first biometric information and the unique information at a specified ratio, and may obtain the second biometric information by performing one-way transform with respect to the concatenated information.

In an embodiment, the first electronic device 210 may concatenate the first biometric information and the unique information at one specified ratio, and may obtain one piece of second biometric information by performing one-way transform with respect to the concatenated information.

In another embodiment, the first electronic device 210 may concatenate the first biometric information and the unique information at a plurality of specified ratios, and may obtain a plurality of pieces of second biometric information by performing one-way transform with respect to the concatenated information. For example, the first electronic device 210 may concatenate the first biometric information and the unique information at a predetermined plurality of concatenation ratios (for example, 0:10, 1:9, 2:8~8:2, 9:1, 10:0), and may obtain a plurality of pieces of second biometric information by performing one-way transform with respect to the concatenated information.

In operation 640, the first electronic device 210 may transmit the second biometric information to an authentication server (for example, the authentication server 230 of FIG. 2). The first electronic device 210 may transmit the second biometric information to the authentication server 230 in operation 640 in order for the authentication server 230 to authenticate fourth biometric information of the user obtained from another electronic device. The fourth biometric information may be information which is generated based on concatenation of biometric information of the user received from a biometric sensor of another electronic device, and unique information of the user. That is, the first electronic device 210 may transmit the second biometric information to the authentication server 230, such that the second biometric information is used as a reference for authentication of the fourth biometric information.

In an embodiment, the first electronic device 210 may additionally transmit, to the authentication server 230, information indicating the concatenation ratio between the first biometric information and the unique information. That is, the first electronic device 210 may transmit, to the authentication server 230, information indicating what concatenation ratio is used for generating the second biometric information.

In an embodiment, the first electronic device 210 may additionally transmit account information of the user to the authentication server 230.

In an embodiment, the first electronic device 210 may receive, from the authentication server 230, a signal indicating that the second biometric information is registered at the authentication server 230. For example, the first electronic device 210 may receive, from the authentication server 230, information indicating that the authentication server 230 has associated the second biometric information with the account information of the user (or with the specific function), and has stored the information.

Figure 7:
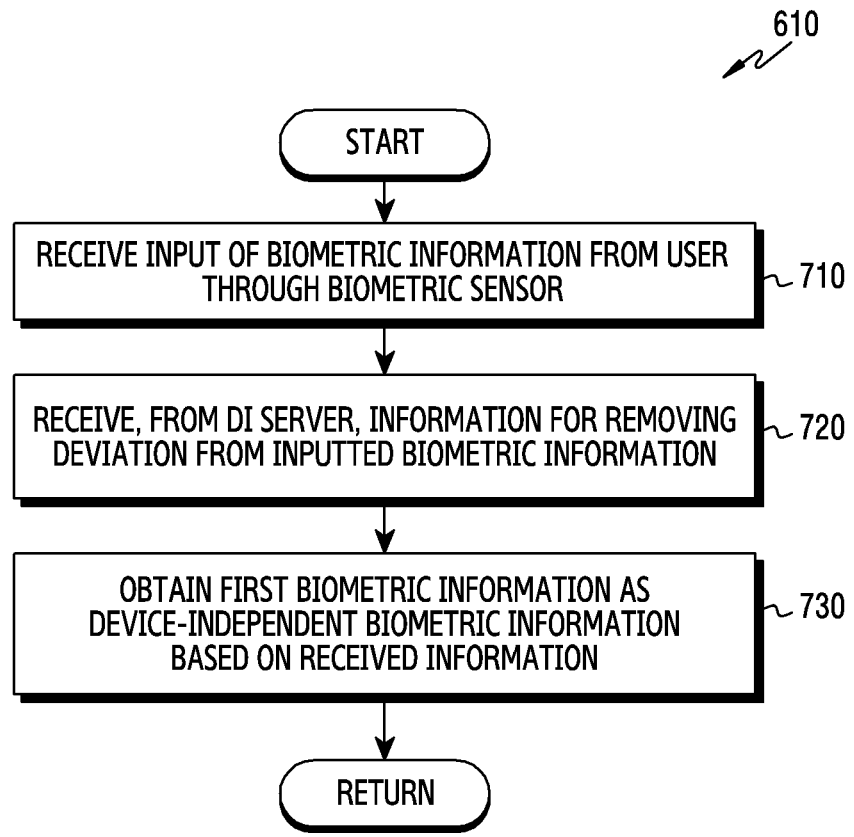
FIG. 7 is a flowchart illustrating a method for obtaining first biometric information as device-independent biometric information by the first electronic device according to an embodiment of the present disclosure.

FIG. 7 is a flowchart illustrating a method for obtaining first biometric information as device-independent biometric information by the first electronic device according to an embodiment of the disclosure.

FIG. 7 is a detailed flowchart of operation 610 of FIG. 6.

In operation 710, the first electronic device 210 may receive an input of biometric information of the user through the biometric sensor 320-1. For example, the first electronic device 210 may obtain a digital image of a user's fingerprint through a fingerprint sensor.

In operation 720, the first electronic device 210 may receive information for removing deviations caused by the biometric sensor 320-1 from the inputted biometric information from a DI server (for example, the DI server 510 of FIG. 5). For example, the first electronic device 210 may transmit, to the DI server 510, identification information of the first electronic device 210 (for example, international mobile equipment identity (IMEI) information) or information (for example, model name, manufacturer, manufacturing version, etc.) of the biometric sensor 320-1 which is used to receive the input of the user's biometric information in operation 710, and then may receive the information for removing the deviations from the DI server 510.

In operation 730, the first electronic device 210 may obtain the first biometric information as the device-independent biometric information based on the received information. For example, the first electronic device 210 may obtain the first biometric information as the device-independent biometric information by applying data received from the DI server 510 to the user's biometric information received from the biometric sensor 320-1.

Figure 8:
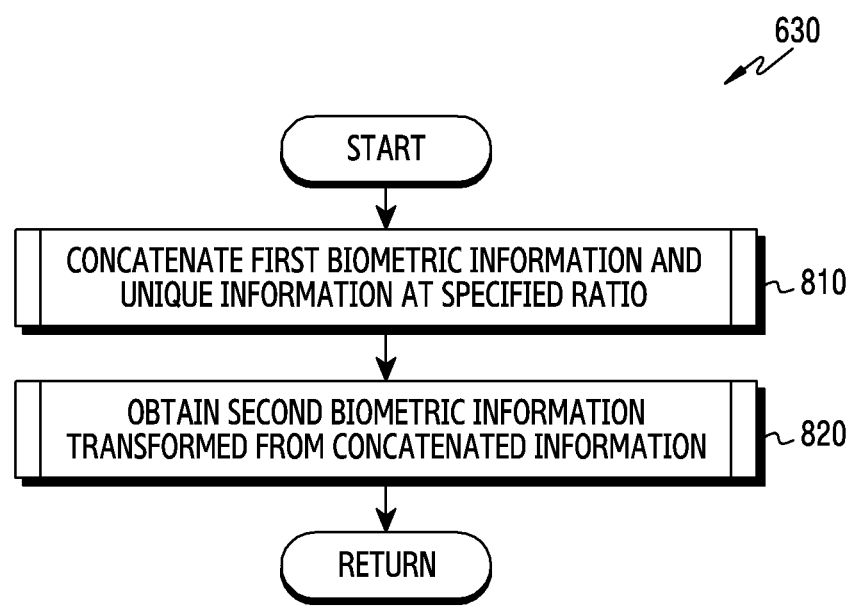
FIG. 8 is a flowchart illustrating a method for obtaining second biometric information to be transmitted to the authentication server by the first electronic device according to an embodiment of the present disclosure.

FIG. 8 is a flowchart illustrating a method for obtaining second biometric information to be transmitted to the authentication server by the first electronic device according to an embodiment of the disclosure.

FIG. 8 is a detailed flowchart of operation 630 of FIG. 6.

In operation 810, the first electronic device 210 may concatenate the first biometric information and the unique information corresponding to the user at a specified ratio. In an embodiment, the specified ratio may refer to a relative ratio between the length of the first biometric information and the length of the unique information. In an embodiment, the first electronic device 210 may adjust the length of the unique information to concatenate the first biometric information and the unique information at the specified ratio. Unlike identification information of a device (for example, IMEI information) having fixed length, the unique information corresponding to the user may have its length adjusted.

In an embodiment, the specified ratio may be determined based on a user input. The first electronic device 210 may receive a user input indicating which of the biometric information and the unique information is more highlighted for setting of biometric authentication with respect to the specific function. For example, the first electronic device 210 may receive a user input for requesting setting of biometric authentication considering only about 100% biometric information, regardless of the unique information corresponding to the user. In another example, the first electronic device 210 may receive a user input for requesting setting of biometric authentication by reflecting the biometric information by about 80%, and by reflecting the unique information corresponding to the user by about 20%.

In an embodiment, the specified ratio may vary depending on application or an attribute of the specified function which may be performed in one application. In this case, the ratio may not be dependent on the user input.

In an embodiment, the attribute of the specific function may be at least one of a content (or category) and importance of the specific function, frequency of use, and a predetermined security level.

For example, when the user sets biometric authentication for execution of a messenger application, the concatenation ratio between the first biometric information and the unique information may be 5:5. In another example, when the user sets biometric authentication for execution of a bank application, the concatenation ratio between the first biometric information and the unique information may be 8:2. The messenger application may correspond to category "life," and the bank application may correspond to category "finance." Since the finance category requires relatively stronger security than the life category, the ratio of the biometric information may be increased.

In another example, when the user sets biometric authentication with respect to specific functions which may be performed in a shopping application, the concatenation ratio between the first biometric information and the unique information regarding a function of changing the quantities of ordered items in the shopping application may be 5:5. In another example, the concatenation ratio between the first biometric information and the unique information regarding a function of paying for an ordered item may be 8:2. The function of changing the quantities of ordered items may correspond to an intermediate stage for "buying items," and the function of paying for the ordered item may correspond to a final stage for "buying items." Therefore, the function of paying for the ordered item has relatively higher importance and thus the ratio of the biometric information for that function may be increased.

In operation 820, the first electronic device 210 may obtain the second biometric information transformed from the concatenated information. For example, the first electronic device 210 may obtain the second biometric information by performing one-way transform with respect to the concatenated information.

The reason why the first electronic device 210 adjusts a ratio between body-based information (for example, the first biometric information) and personal information-based information (for example, the unique information corresponding to the user) is that the ratio corresponds to a false acceptance rate (FAR) and a ratio of authentication by the same user.

In an extreme example, if the first electronic device 210 concatenates the first biometric information and the unique information at the ratio of 0:10, the false negatives may be improved because authentication succeeds when the same personal information is identified regardless of biometric information. However, in this case, since it is not 100% guaranteed that the same user is using the same personal information is identified (for example, this may occur when a son uses the smart phone of his farther), the ratio of authentication by the same user may be inevitably reduced.

In another extreme example, if the first electronic device 210 concatenates the first biometric information and the unique information at the ratio of 10:0, authentication may succeed at any terminal (that is, even at a terminal having a SIM of a user different from the user corresponding to the SIM of the first electronic device) as long as the same biometric information is identified. In this case, since only the biometric information is considered, authentication by the same user can be guaranteed. But false negatives may increase because the biometric information may have minute differences due to characteristics of the biometric information. Thus, biometric information from the same user that should be authenticated may instead by rejected.

As a result, improvements of false negatives and the authentication of the same user have a trade-off relationship with each other, and this relationship may be implemented according to the concatenation ratio between the first biometric information and the unique information of the user. Accordingly, the concatenation ratio between the first biometric information and the unique information of the user may be changed according to various policies as described above. Since the concatenation ratio between the first biometric information and the unique information is a matter of selecting which of the FAR improvement and the authentication by the same user is given more weight, the concentration ratio may be determined according to an attribute of a specific function requesting biometric authentication. In addition, the concentration ratio may be determined according to a user input.

Figure 9:
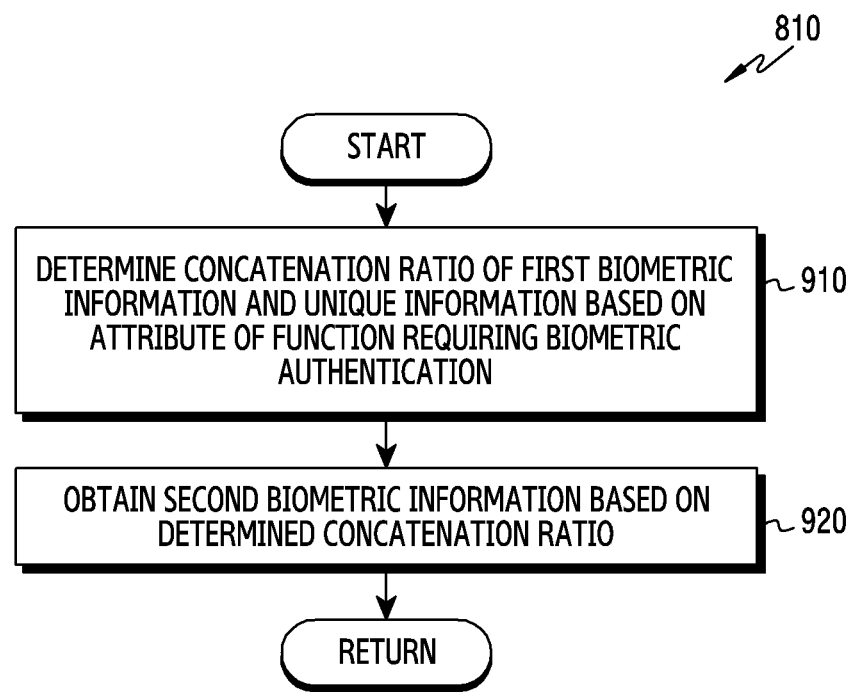
FIG. 9 is a flowchart illustrating a method for obtaining second biometric information to be transmitted to the authentication server by the first electronic device according to an embodiment of the present disclosure.

FIG. 9 is a flowchart illustrating a method for obtaining second biometric information to be transmitted to the authentication server by the first electronic device according to an embodiment of the disclosure.

FIG. 9 is a detailed flowchart of operation 810 of FIG. 8.

In operation 910, the first electronic device 210 may determine the concentration ratio between the first biometric information and the unique information, based on an attribute of a function requesting biometric authentication.

In an embodiment, the function that requests the biometric authentication may refer to the function associated with the user input which is received at the first electronic device 210 in operation 610. For example, when biometric authentication is required for execution of a messenger application, the function requesting the biometric authentication may refer to execution of the messenger application.

In an embodiment, the attribute of the function requesting the biometric authentication may be at least one of a content (or category) and importance of the function requesting the biometric authentication, frequency of use, and a predetermined security level. The first electronic device 210 may determine at least one of the plurality of concentration ratios based on the attributes of the function requesting the biometric authentication. For example, regarding the function of executing the shopping application, the first electronic device 210 may determine that the category of the shopping application is shopping (or finance), and accordingly, may determine the concatenation ratio of 5:5 from among the plurality of concatenation ratios (for example, 0:10, 1:9, 2:8~8:2, 9:1, 10:1). In another example, regarding a function of executing a setting application which can change settings of the first electronic device 210, the first electronic device 210 may identify that the security level for execution of the setting application is set to be the highest, and accordingly, may determine the concatenation ratio 9:1 from among the plurality of concatenation ratios.

In operation 920, the first electronic device 210 may obtain the second biometric information based on the determined concatenation ratio. The first electronic device 210 may concatenate the first biometric information and the unique information at the determined concatenation ratio, and may obtain the second biometric information by transforming the concatenated information in one direction.

Figure 10:
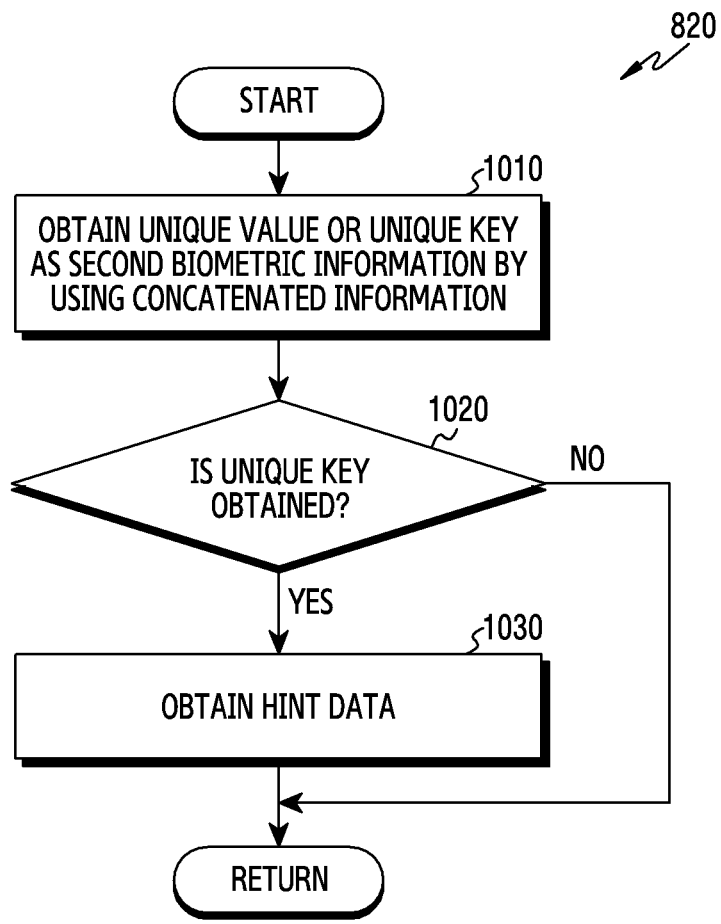
FIG. 10 is a flowchart illustrating a method for obtaining second biometric information to be transmitted to the authentication server by the first electronic device according to an embodiment of the present disclosure.

FIG. 10 is a flowchart illustrating a method for obtaining second biometric information to be transmitted to the authentication server by the first electronic device according to an embodiment of the disclosure.

FIG. 10 is a detailed flowchart of operation 820 of FIG. 8.

In operation 1010, the first electronic device 210 may obtain a unique biometric feature value or a unique key as the second biometric information by using the concatenated information.

In an embodiment, the first electronic device 210 may extract a unique biometric feature value from the concatenated information. In another embodiment, the first electronic device 210 may extract a unique key from the concatenated information through a fuzzy extraction method, for example. In still another embodiment, the first electronic device 210 may extract a unique biometric feature value from the concatenated information, and may extract a unique key from the biometric unique feature value through the fuzzy extraction method, for example.

In operation 1020, the first electronic device 210 may identify whether the unique key is obtained. When it is identified that the unique key is obtained, the first electronic device 210 may obtain hint data in operation 1030. The hint data may be used as base data in restoring the same key in the authentication process. That is, the second electronic device 220 may restore the same key by using the hint data.

In operation 1030, when it is identified that the unique key is not obtained, the first electronic device 210 may not obtain the hint data and may proceed to the next step. That is, the hint data may be obtained only when the unique key is obtained.

Figure 11:
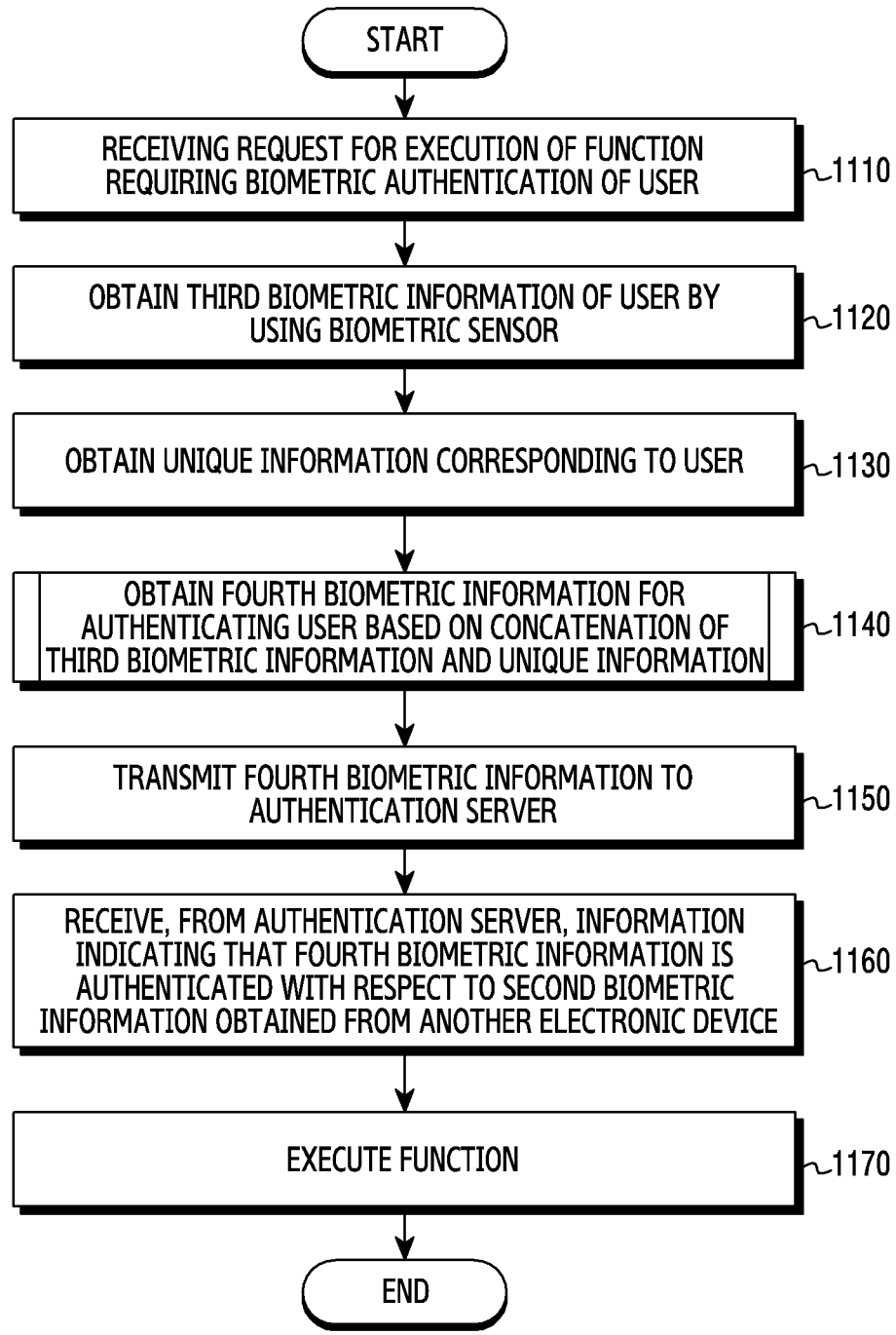
FIG. 11 is a flowchart illustrating a method for receiving authentication of biometric information through the authentication server by the second electronic device according to an embodiment of the present disclosure.

FIG. 11 is a flowchart illustrating a method for authenticating biometric information by a second electronic device through an authentication server according to an embodiment of the disclosure.

Operations disclosed in FIG. 11 may be performed by the second electronic device (for example, the second electronic device 220) or a processor of the second electronic device (for example, the processor 120-2). Hereinbelow, it will be illustrated that the operations disclosed in FIG. 11 are performed by the second electronic device 220.

The operations disclosed in FIG. 11 may be performed on a particular region of the processor 120-2 dedicated for software security.

In operation 1110, the second electronic device 220 may be requested to execute a function that requires biometric authentication of a user. For example, the second electronic device 220 may receive a user input for executing the function requiring the biometric authentication of the user. In another example, the second electronic device 220 may be requested to execute the function requiring the biometric authentication of the user according to a pre-stored command. In still another example, the second electronic device 220 may be requested to execute the function requiring the biometric authentication of the user by receiving data (for example, text message, call, update notification related to an application installed at the second electronic device, etc.) from an external device.

It may be pre-determined whether the biometric authentication of the user is required for execution of a specific function. For example, the user may pre-set to execute a messenger application only when the biometric authentication of the user is successfully completed. In another example, the user may pre-set to approve payment via an account of the user in a shopping application only when the biometric authentication of the user is successfully completed.

In operation 1120, the second electronic device 220 may obtain third biometric information of the user by using a biometric sensor (for example, the biometric sensor 320-2 of FIG. 5). In an embodiment, the third biometric information may be biometric information of the user which is received through the biometric sensor 320-2 and from which deviations caused by the sensor 320-2 are removed.

In operation 1130, the second electronic device 220 may obtain unique information corresponding to the user. In an embodiment, the second electronic device 220 may provide information regarding a SIM card installed at the second electronic device 220 to the ID server 520, and may obtain the unique information of the user corresponding to the SIM card from the ID server 520. In another embodiment, the second electronic device 220 may obtain the unique information corresponding to the user, based on information obtained by using a sensor. For example, the second electronic device may photograph a physical ID card including unique identification information of the user with a camera, and may obtain the unique information of the user by using the photographed image. For example, the second electronic device 220 may obtain the unique information corresponding to the user from the photographed image by using an OCR technique.

In operation 1140, the second electronic device 220 may obtain fourth biometric information for authenticating the user, based on concatenation of the third biometric information and the unique information corresponding to the user. In an embodiment, the second electronic device 220 may concatenate the third biometric information and the unique information corresponding to the user at a specified ratio, and may obtain the fourth biometric information by performing one-way transform with respect to the concatenated information. In an embodiment, the second electronic device 220 may receive information regarding a specific concatenation ratio for generating the fourth biometric information from the authentication server 230, and then may concatenate the third biometric information and the unique information corresponding to the user at the specific concatenation ratio.

In operation 1150, the second electronic device 220 may transmit the fourth biometric information to the authentication server 230. In an embodiment, the second electronic device 220 may transmit a unique biometric feature value, which is obtained by performing one-way transform with respect to the concatenated information, to the authentication server 230. In another embodiment, the second electronic device 220 may derive a public key and a unique key from the unique biometric feature value, and may transmit information electronically signed by using the unique key to the authentication server 230.

In an embodiment, the second electronic device 220 may additionally transmit information regarding the concatenation ratio related to the fourth biometric information (that is, information regarding on what concatenation ratio the fourth biometric information is based) to the authentication server 230.

In operation 1160, the second electronic device 220 may receive, from the authentication server 230, information indicating that the fourth biometric information is authenticated with respect to second biometric information obtained from another electronic device. In an embodiment, the second biometric information may be information that is transmitted to the authentication server 230 from the first electronic device 210. For example, when the fourth biometric information and the second biometric information are both unique biometric feature values, the second electronic device 220 may receive, from the authentication server 230, information indicating that the fourth biometric information is the same as the second biometric information, and the fourth biometric information is successfully authenticated with respect to the second biometric information. In another example, when the second biometric information is information electronically signed with a public key, and the fourth biometric information is information electronically signed with a corresponding private key, the second electronic device 220 may receive, from the authentication server 230, information indicating that the fourth biometric information is successfully authenticated with respect to the second biometric information.

In operation 1170, the second electronic device 220 may perform the function. In an embodiment, the second electronic device 220 may perform the function in response to receiving the information indicating that the fourth biometric information is successfully authenticated with respect to the second biometric information from the authentication server 230. For example, the second electronic device 220 may execute a messenger application or may approve payment in a shopping application. In another example, the second electronic device 220 may download data corresponding to the user account in the second electronic device in a cloud application.

Figures 12A, 12B:
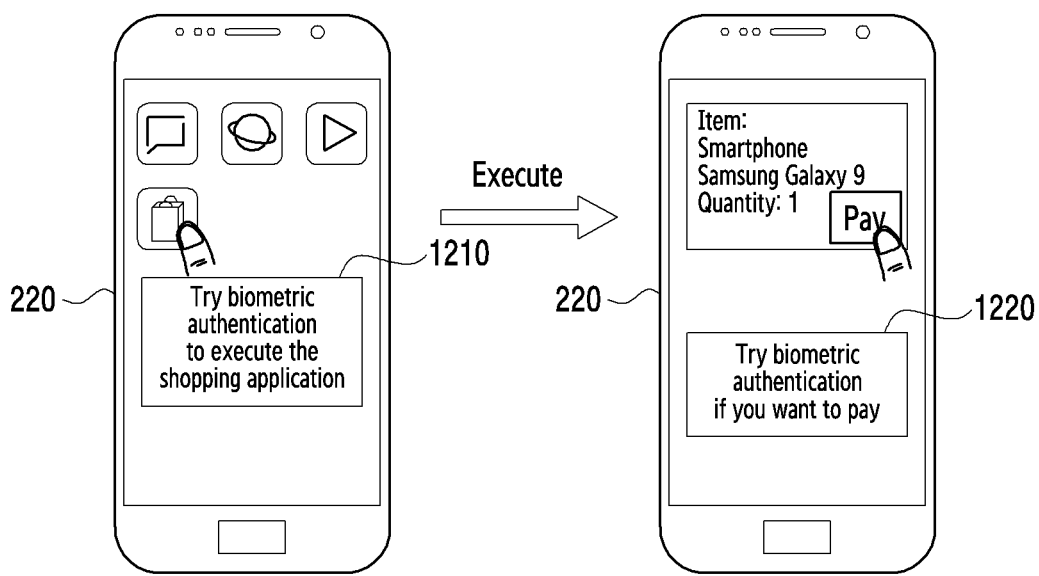
FIG. 12A and FIG. 12B are views illustrating different concatenation ratios according to attributes of functions to be performed by the second electronic device, according to embodiments of the present disclosure.

FIGS. 12A and 12B are views illustrating different concatenation ratios according to attributes of functions to be performed by the second electronic device according to embodiments of the disclosure.

Referring to FIG. 12A, the second electronic device 220 may receive a user input for requesting execution of a specific function (hereinafter, a first function) for which biometric authentication is required. For example, the second electronic device 220 may receive a user input for selecting an execution icon of a shopping application.

In an embodiment, the second electronic device 220 may identify that biometric authentication is required for execution of the first function, and may provide a message instructing the user to perform biometric authentication. For example, the second electronic device 220 may display a message 1210 saying "Try biometric authentication to execute the shopping application." The message may be displayed through a pop-up window. The message may be provided in the form of a voice message. The second electronic device 220 may activate the biometric sensor 320-2, if the biometric sensor 320-2 is deactivated at the time.

In an embodiment, the second electronic device 220 may generate fourth biometric information to be transmitted to the authentication server 230 by using the user's biometric information received through the activated biometric sensor 320-2. The second electronic device 220 may generate the fourth biometric information by using a first concatenation ratio. That is, the second electronic device 220 may generate third biometric information, which is the device-independent biometric information, by using the user's biometric information received through the activated biometric sensor, may concatenate the third biometric information with unique information corresponding to the user at the first concatenation ratio, and may generate the fourth biometric information by transforming the concatenated information.

In an embodiment, the second electronic device 220 may transmit the fourth biometric information to the authentication server 230, and may execute the shopping application in response to receiving from the authentication server 230 information indicating that the fourth biometric information is authenticated with respect to second biometric information obtained from another electronic device.

Referring to FIG. 12B, the second electronic device 220 may receive a user input for requesting execution of a specific function (hereinafter, a second function) for which biometric authentication is required. For example, the second electronic device 220 may receive a user input for requesting payment for a specific product in the executed shopping application.

In an embodiment, the second electronic device 220 may identify that biometric authentication is required for the execution of the second function, and may provide a message requesting the user to perform biometric authentication. For example, the second electronic device 220 may display a message 1220 saying "Try biometric authentication if you want to pay." The message may be displayed through a pop-up window. The message may be provided in the form of a voice message. The second electronic may activate the biometric sensor, if the sensor is deactivated at the time.

In an embodiment, the second electronic device 220 may generate fourth biometric information to be transmitted to the authentication server 230 by using user's biometric information received through the activated biometric sensor 320-2. The second electronic device 220 may generate the fourth biometric information by using a second concatenation ratio. That is, the second electronic device 220 may generate third biometric information, which is the device-independent biometric information, by using the user's biometric information received through the activated biometric sensor, may concatenate the third biometric information with unique information corresponding to the user at the second concatenation ratio, and may generate the fourth biometric information by transforming the concatenated information.

In an embodiment, in the second concatenation ratio, the ratio of the unique information corresponding to the user to the entire information may be smaller than in the first concatenation ratio. In other words, the ratio of the third biometric information to the entire information may be greater. In an embodiment, the first concatenation ratio and the second concatenation ratio may be determined based on the first function and the second function. The reason why the ratio of the unique information in the second concatenation ratio is set to be smaller than in the first concatenation ratio is that the second function (the payment function in the shopping application) requires a higher level of security than the first function (the execution function of the shopping application). That is, the user may provide information related to the concatenation ratio in the process of setting, and the second electronic device may determine the concatenation ratio based on attributes of the functions to be executed, and may generate the fourth biometric information at the determined concatenation ratio.

The second electronic device 220 may generate the fourth biometric information at different concatenation ratios in order to execute different functions (or different applications) corresponding to the same category (for example, shopping or finance). The second electronic device 220 may determine the concatenation ratio for generating the fourth biometric information by retrieving metadata of an application installed at the second electronic device 220. The second electronic device 220 may determine the concatenation ratio for generating the fourth biometric information based on data received from an external device (for example, a server) related to a function (or a service) that the electronic device 220 will execute.

Figure 13:
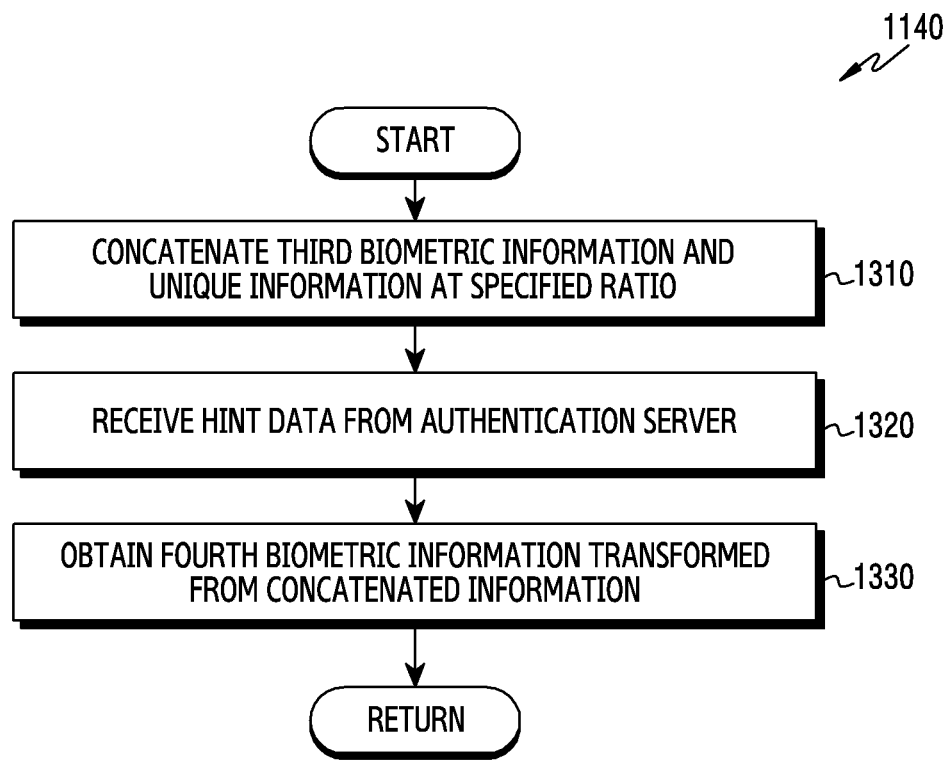
FIG. 13 is a flowchart illustrating a method for obtaining fourth biometric information to be transmitted to the authentication server by the second electronic device according to an embodiment of the present disclosure.

FIG. 13 is a flowchart illustrating a method for obtaining fourth biometric information to be transmitted to the authentication server by the second electronic device according to an embodiment of the disclosure.

FIG. 13 is a detailed flowchart of operation 1140 of FIG. 11.

In operation 1310, the second electronic device 220 may concatenate the third biometric information and the unique information corresponding to the user at a specified ratio.

In an embodiment, the second electronic device 220 may receive, from the authentication server 230 corresponding to a function requested to be performed, information regarding a concatenation ratio for concatenating the third biometric information and the unique information corresponding to the user in operation 1310. The second electronic device 220 may concatenate the third biometric information and the unique information based on the received information.

In another embodiment, the second electronic device 220 may not receive the information regarding the concatenation ratio from the authentication server 230, or may concatenate the third biometric information and the unique information at a concatenation ratio different from the concatenation ratio included in the information received from the authentication server. For example, the first electronic device 210 may concatenate the first biometric information and the unique information at a predetermined plurality of concatenation ratios, and may obtain a plurality of pieces of second biometric information by performing one-way transform with respect to the concatenated information and may register the same at the authentication server 230. The second electronic device 220 may concatenate the third biometric information and the unique information at a second concatenation ratio (for example, 3:7) different from a first concatenation ratio (for example, 2:8) according to a current situation of the second electronic device even when information regarding the first concatenation ratio is received from the authentication server 230. The current situation of the second electronic device 220 may be related to attributes of radio access technology of a communication network connected between the second electronic device 220 and the authentication server 230, and to whether the network is open WiFi. For example, when the second electronic device 220 is connected with the authentication server 230 through open WiFi, which is more vulnerable to security threats than LTE, the second electronic device 220 may concatenate the third biometric information and the unique information at the second concatenation ratio in which the ratio of the biometric information increases in comparison to the first concatenation ratio.

In operation 1320, the second electronic device 220 may receive hint data for extracting a unique biometric feature value from the concatenated information. The hint data may be used as base data in restoring the same key in the authentication process. When account information inputted from the second electronic device 220 is not stored in the database of the authentication server 230, the authentication server 230 may not provide hint data to the second electronic device 220 although this operation is not illustrated.

In operation 1330, the second electronic device 220 may obtain fourth biometric information transformed from the concatenated information. In an embodiment, the second electronic device 220 may transform the concatenated information into the fourth biometric information by using the hint data. In an embodiment, the fourth biometric information may be the same as the second biometric information transmitted to the authentication server 230 in the registering process. In another embodiment, the difference between the fourth biometric information and the second biometric information may fall within a predetermined value.

Figure 14:
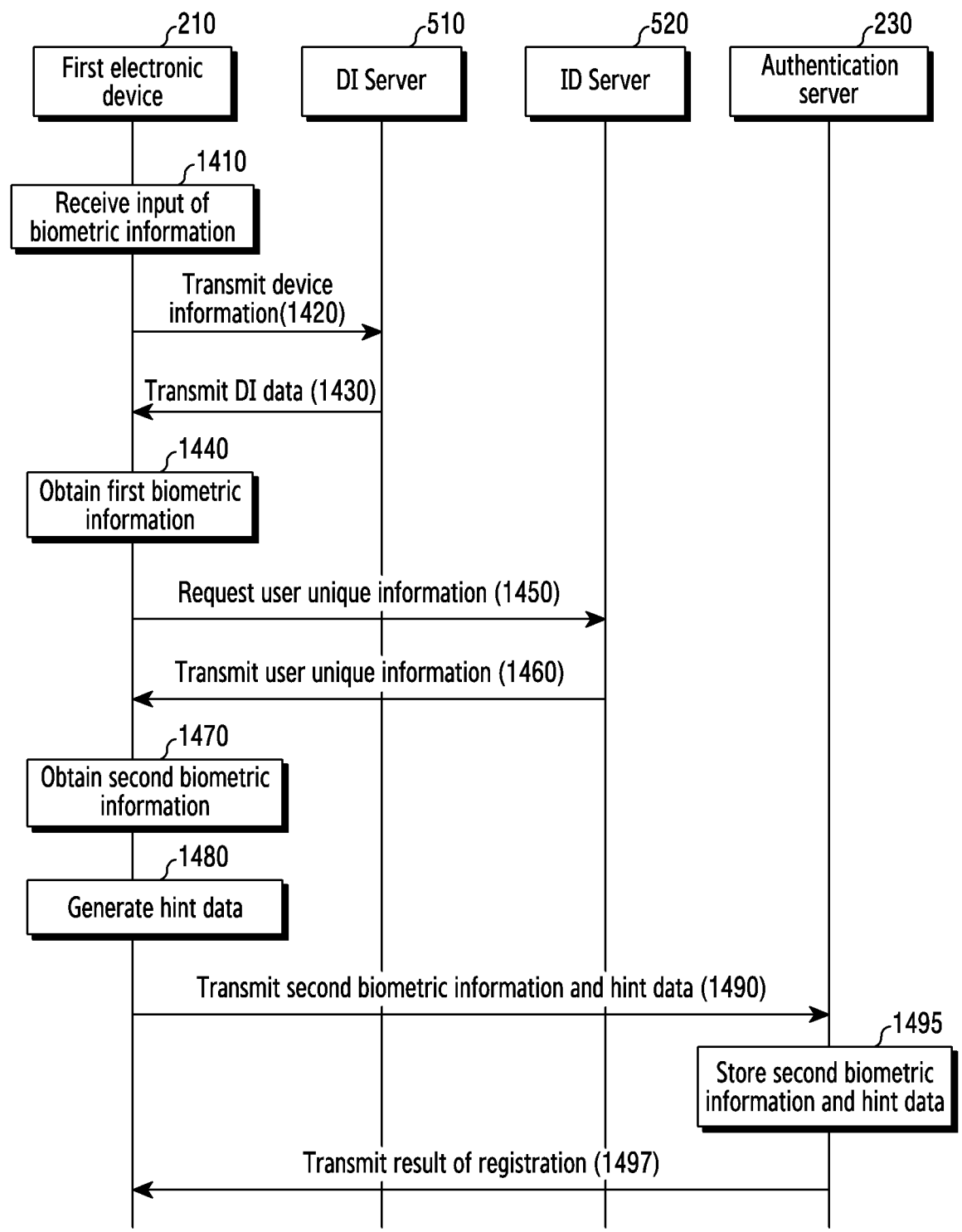
FIG. 14 is a signal diagram illustrating signaling between the first electronic device and a plurality of external servers including the authentication server according to an embodiment of the present disclosure.

FIG. 14 is a signal diagram illustrating signaling between the first electronic device and the plurality of external servers including the authentication server according to an embodiment of the disclosure.

Referring to FIG. 14, the plurality of external servers may include the DI server 510, the ID server 520, and the authentication server 230.

In operation 1410, the first electronic device 210 may receive an input of biometric information of the user through the biometric sensor. The first electronic device 210 may receive a user input for requiring biometric authentication for a specific function prior to receiving the biometric information of the user through the biometric sensor 320-1 although this operation is not illustrated. In addition, the first electronic device 210 may receive a user input of associating an attribute (or characteristic) of the biometric authentication to the specific function.

In operation 1420, the first electronic device 210 may transmit device information (or identification information) of the first electronic device 210 to the DI server 510. For example, the first electronic device 210 may transmit IMEI information of the first electronic device 210 to the DI server 510.

In operation 1430, the DI server 510 may transmit DI data to the first electronic device 210. In an embodiment, the DI data may be data for removing deviations caused by the hardware and/or software of the biometric sensor 320-1 from the biometric information of the user received through the biometric sensor 320-1.

In an embodiment, operation 1420 and/or 1430 may be performed before operation 1410.

In operation 1440, the first electronic device 210 may obtain first biometric information. In an embodiment, the first biometric information may be device-independent biometric information generated by the first electronic device 210 using the DI data. In an embodiment, the first electronic device 210 may obtain the first biometric information by applying the DI data to the biometric information received through the biometric sensor 320-1.

In operation 1450, the first electronic device 210 may transmit a signal requesting unique information of the user to the ID server 520. For example, the first electronic device 210 may provide information regarding a SIM card installed at the first electronic device 210 to the ID server 520.

In operation 1460, the first electronic device 210 may receive user unique information from the ID server 520. In an embodiment, the first electronic device 210 may receive unique information of the user corresponding to the SIM card from the ID server 520.

In operation 1470, the first electronic device 210 may obtain second biometric information. In an embodiment, the first electronic device 210 may concatenate the first biometric information and the unique information of the user at a specific ratio, and may obtain the second biometric information by performing one-way transform with respect to the concatenated information. In an embodiment, the first electronic device 210 may generate a unique biometric feature value by performing one-way transform with respect to the concatenated information.

In operation 1480, the first electronic device 210 may generate hint data. In an embodiment, the hint data may be base data which is used for restoring the unique biometric feature value at another electronic device (for example, the second electronic device 220), when biometric authentication is attempted at the other electronic device.

In operation 1490, the first electronic device 210 may transmit the second biometric information and the hint data to the authentication server 230.

In operation 1495, the authentication server 230 may store the second biometric information and the hint data received from the first electronic device 210. In an embodiment, the authentication server 230 may map the second biometric information and the hint data received from the first electronic device 210 onto user account information, and may store the mapped information. In another embodiment, the authentication server 230 may map the second biometric information and the hint data received from the first electronic device 210 onto a specific function corresponding to the registering process, and may store the mapped information.

In operation 1497, the authentication server 230 may transmit the result of registering to the first electronic device 210. In an embodiment, the authentication server 230 may transmit, to the first electronic device 210, a signal indicating that the second biometric information is successfully registered at the authentication server 230. In another embodiment, the authentication server 230 may transmit, to the first electronic device 210, a signal indicating that the registration of the second biometric information failed.

Figure 15:
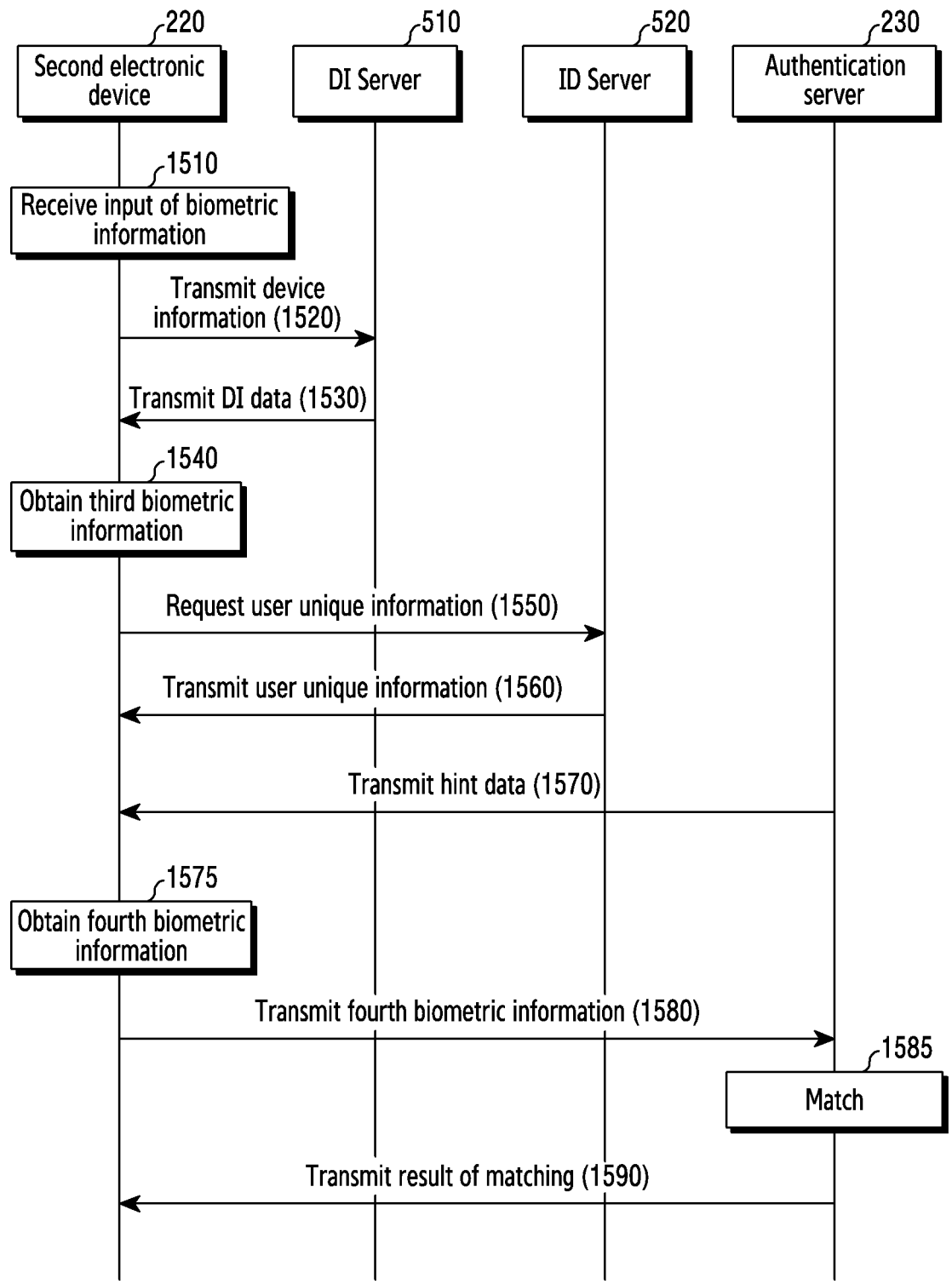
FIG. 15 is a signal diagram illustrating signaling between the second electronic device and the plurality of external servers including the authentication server according to an embodiment of the present disclosure.

FIG. 15 is a signal diagram illustrating signaling between the second electronic device and the plurality of external servers including the authentication server according to an embodiment of the disclosure.

Referring to FIG. 15, the plurality of servers may include the DI server 510, the ID server 520, and the authentication server 230.

Where operations 1510 to 1560 are similar to operations 1410 to 1460 disclosed in FIG. 14, detailed descriptions thereof are omitted.

However, in the operations shown in FIG. 15, information that is obtained by applying DI data received from the DI server 510 to biometric information received through the biometric sensor 320-2 may be third biometric information. The third biometric information may be obtained in the same way as the first biometric information, however different hardware (e.g. the first electronic device versus the second electronic device) are used to obtain the first and third biometric information.

In operation 1570, the authentication server 230 may transmit hint data to the second electronic device 220. In an embodiment, the hint data that authentication server 230 transmits to the second electronic device 220 may be the same as the hint data that the first electronic device 210 transmits to the authentication server 230 in the registering process.

The second electronic device 220 may request hint data from the authentication server 230 before the authentication server 230 transmits hint data to the second electronic device 220, although this operation is not illustrated. In an embodiment, when the second electronic device 220 requests hint data from the authentication server 230, the second electronic device 220 may additionally transmit information regarding a user account corresponding to the user of the second electronic device 220. In another embodiment, the second electronic device 220 may have transmitted the information regarding the user account corresponding to the user of the second electronic device 220 before operation 1510.

In an embodiment, when the received user account matches a pre-stored account, the authentication server 230 may transmit the hint data to the second electronic device 220. Conversely, when the received user account does not match the pre-stored account, the authentication server 230 may not transmit the hint data to the second electronic device 220, and may cancel the authentication operation. In this case, the second electronic device 220 may provide relevant information to the user in the form of a pop-up message. For example, the second electronic device 220 may display a pop-up message saying "The entered account does not match the registered user account" on the display.

In operation 1575, the second electronic device 220 may obtain fourth biometric information. In an embodiment, the second electronic device 220 may concatenate the third biometric information and the unique information of the user at a specified ratio, and may obtain the fourth biometric information by performing one-way transform with respect to the concatenated information. In an embodiment, the fourth biometric information may be at least one of a unique biometric feature value or a unique key. The second electronic device 220 may obtain the fourth biometric information by using the received hint data.

In operation 1580, the second electronic device 220 may transmit the fourth biometric information to the authentication server 230. For example, the second electronic device 220 may transmit the biometric unique feature value to the authentication server 230.

In operation 1585, the authentication server 230 may match the fourth biometric information with pre-stored biometric information. In an embodiment, the pre-stored biometric information may be the second biometric information which is received from the first electronic device 210. The authentication server 230 may determine that the fourth biometric information is successfully authenticated only when the fourth biometric information and the second biometric information have the same value. In another embodiment, the authentication server 230 may determine that the fourth biometric information is successfully authenticated only when the difference between the fourth biometric information and the second biometric information falls within a predetermined range.

In operation 1590, the authentication server 230 may transmit the result of matching to the second electronic device 220. In an embodiment, the authentication server 230 may transmit, to the second electronic device 220, a message indicating that the fourth biometric information is successfully authenticated with respect to the second biometric information, or a message indicating that the fourth biometric information is not authenticated with respect to the second biometric information.

FIG. 16A is a table illustrating a scenario when biometric information and unique information are concatenated according to a first concatenation ratio with the same user using different devices according to an embodiment of the disclosure. FIG. 16B is a table illustrating another scenario when the biometric information and the unique information are concatenated according to the first concatenation ratio with the same user using different devices according to an embodiment of the disclosure. FIG. 16C is a table illustrating yet another scenario when the biometric information and the unique information are concatenated according to the first concatenation ratio with the same user using different devices according to an embodiment of the disclosure. And FIG. 16D is table illustrating still yet another scenario when the biometric information and the unique information are concatenated according to the first concatenation ratio with the same user using different devices according to an embodiment of the disclosure.

Referring to FIGS. 16A, 16B, 16C, and 16D, four cases corresponding to the first concatenation ratio are disclosed. In each case, the first electronic device 210 may register processed biometric information (for example, second biometric information) of the user at the authentication server 230, and the second electronic device 220 may try to authenticate (e.g. request the authentication server to authenticate) processed biometric information (for example, fourth biometric information) of the user.

In an embodiment, the first concatenation ratio for concatenating the first biometric information (or third biometric information) and the unique information corresponding to the user may be a ratio of 1:1. In a 1:1 ratio, the length of the first biometric information (or third biometric information) and the length of the unique information corresponding to the user are the same as each other.

In an embodiment, the first biometric information generated by the first electronic device 210 and the third biometric information generated by the second electronic device 220 may be different from each other. The first biometric information and the third biometric information may both be device-independent biometric information from which deviations caused by the sensors have been removed, but the first biometric information and the third biometric information may still be different from each other due to the fact that characteristics of the biometric information inputted at different times may be different. This may be caused by biological variations. For example, the first biometric information may be ABC, and the third biometric information generated by the second electronic device may be ABD (FIGS. 16A, 16B, and 16C). In another example, the first biometric information may be ABC and the third biometric information may be ABZ (FIG. 16D).

In an embodiment, the first electronic device 210 may determine unique information corresponding to the user, based on information of a SIM card installed at the first electronic device 210. In addition, the second electronic device 220 may determine unique information corresponding to the user, based on information of a SIM card installed at the second electronic device 220. When the user draws out the SIM card installed at the first electronic device 210 and installs the same at the second electronic device 220, or the SIM card installed at the first electronic device 210 and the SIM card installed at the second electronic device 220 correspond to the same user, the unique information corresponding to the user, obtained by the first electronic device 210 and the second electronic device, may be the same.

FIG. 16A illustrates a case in which the second biometric information and the fourth biometric information are the same and thus authentication succeeds.

According to an embodiment, the first electronic device 210 and the second electronic device 220 may concatenate the first biometric information and the unique information corresponding to the user (or a feature value extracted from the unique information corresponding to the user) at the first concatenation ratio. For example, information concatenated at the first electronic device 210 may be ABC123, and information concatenated at the second electronic device 220 may be ABD123.

The first electronic device 210 and the second electronic device 220 may generate the second biometric information or the fourth biometric information by transforming the concatenated information in one direction. In an embodiment, the first electronic device 210 may extract a unique biometric feature value az39 from the concatenated information ABC 123 as the second biometric information. In addition, the second electronic device 220 may extract a unique biometric feature value az39 from the concatenated information ABD123 as the fourth biometric information.

That is, the second electronic device 220 may generate the same unique biometric feature value az39 as that of the first electronic device 210, even when the concatenated information at the second electronic device 220 is different from that of the first electronic device 210 (ABC123 versus ABD123). In an embodiment, the second electronic device 220 may receive hint data from the authentication server 230 prior to generating the unique biometric feature value, and may generate the same unique biometric feature value as that of the first electronic device 210 by using the received hint data.

In an embodiment, the authentication server may authenticate the fourth biometric information with respect to the second biometric information, based on the result of comparing the second biometric information and the fourth biometric information. Since the fourth biometric information az39 is the same as the second biometric information az39, the authentication server may determine that the fourth biometric information is successfully authenticated with respect to the second biometric information, and may transmit a message indicating that the fourth biometric information is successfully authenticated to the second electronic device.

FIG. 16B illustrates a case in which a public key algorithm is additionally used.

According to an embodiment, the first electronic device 210 may derive a public key and a unique key from the second biometric information az39, and may transmit the derived public key to the authentication server 230. For example, the second electronic device 220 may derive a public key and a unique key from the fourth biometric information az39, and may transmit information electronically signed by using the derived unique key to the authentication server 230.

When the electronically signed information transmitted from the second electronic device 220 is decoded by the public key transmitted from the first electronic device 210, the authentication server 230 may determine that the fourth biometric information is successfully authenticated with respect to the second biometric information, and may transmit a message indicating that the fourth biometric information is successfully authenticated to the second electronic device 220.

FIGS. 16C and 16D illustrate cases in which authentication succeeds or fails when the difference between the second biometric information and the fourth biometric information falls within or without a specified range as the second biometric information and the fourth biometric information are not the same.

Since the process of concatenating the first biometric information and the unique information corresponding to the user is the same as in FIG. 16A, detailed description thereof is omitted.

According to an embodiment, in FIG. 16C, the first electronic device 210 may generate a biometric unique feature value xyz986 as the second biometric information by transforming the concatenated information ABC123 in one direction. In addition, the second electronic device 220 may also generate a biometric unique feature value xyz987 as the fourth biometric information by transforming the concatenated information ABD123 in one direction.

The authentication server 230 may determine that the fourth biometric information is successfully authenticated with respect to the second biometric information when the difference value between the second biometric information xyz986 and the fourth biometric information xyz987 falls within a specified range, even if the second biometric information and the fourth biometric information are not the same.

The same difference (or error) in information may be maintained before and after the transform (ABC/ABD before the transform, xyz986/xyz987 after the transform). However, since the total amount of information after the transform has increased, the ratio of the difference (or error) of the information to the whole may be reduced. Accordingly, the false negative rate, when compared to simply using the biometric information without the unique information corresponding to the user, may be improved.

According to an embodiment, in FIG. 16D, the first electronic device 210 may generate a biometric unique feature value xyz986 as the second biometric information by transforming the concatenated information ABC123 in one direction. In addition, the second electronic device 220 may generate a biometric unique feature value xyz912 as the fourth biometric information by transforming the concatenated information ABZ123 in one direction.

The authentication server 230 may identify that a difference between the second biometric information xyz986 and the fourth biometric information xyz912 does not fall within the specified range, and may determine that the fourth biometric information is not authenticated with respect to the second biometric information.

FIG. 17A is a table illustrating a scenario when biometric information and unique information are concatenated according to a second concatenation ratio with the same user using different devices according to an embodiment of the disclosure. FIG. 17B is a table illustrating another scenario when the biometric information and the unique information are concatenated according to the second concatenation ratio with the same user using different devices according to an embodiment of the disclosure. FIG. 17C is a table illustrating yet another scenario when the biometric information and the unique information are concatenated according to the second concatenation ratio with the same user using different devices according to an embodiment of the disclosure. And FIG. 17D is a table illustrating still yet another scenario when the biometric information and the unique information are concatenated according to the second concatenation ratio with the same user using different devices according to an embodiment of the disclosure.

Referring to FIGS. 17A, 17B, 17C, and 17D, four cases corresponding to the second concatenation ratio are disclosed. In each case, the first electronic device 210 may register processed biometric information (for example, second biometric information) of the user at the authentication server 230, and the second electronic device 220 may try to authenticate (e.g. request the authentication server to authenticate) processed biometric information (for example, fourth biometric information) of the user.

In an embodiment, the second concatenation ratio for concatenating the first biometric information (or third biometric information) and the unique information corresponding to the user may be a ratio of 3:7. In a 3:7 ratio, the length of the first biometric information (or third biometric information) to the length of the unique information corresponding to the user is 3:7.

For example, referring to FIG. 17A, the first electronic device 210 may concatenate first biometric information ABC and user unique information 1234567 (ABC1234567), and the second electronic device 220 may concatenate third biometric information ABD and user unique information 1234567 (ABD1234567).

The first electronic device 210 and the second electronic device 220 may generate second biometric information or fourth biometric information by transforming the concatenated information in one direction. In an embodiment, the first electronic device 210 may extract a unique biometric feature value 8zs5 as the second biometric information from the concatenated information ABC1234567. The second electronic device 220 may extract the same unique biometric feature value 8zs5 as that of the first electronic device as the fourth biometric information from the concatenated information ABD1234567. The first electronic device 210 and the second electronic device 220 may transmit the second biometric information and the fourth biometric information to the authentication server 230, respectively, and the authentication server 230 may determine that the fourth biometric information is successfully authenticated with respect to the second biometric information since the fourth biometric information is the same as the second biometric information.

The case in FIG. 17B is the same as the case of FIG. 16B except for the concatenation ratio and thus detailed description thereof is omitted.

FIG. 17C illustrates a case in which the fourth biometric information is successfully authenticated with respect to the second biometric information even when the difference between the first biometric information and the third biometric information is relatively great as compared to the case shown in FIG. 16C.

In an embodiment, the first electronic device 210 may concatenate the first biometric information ABC and the unique information 1234567 corresponding to the user, and may generate second biometric information xysab02 by performing one-way transform with respect to the concatenated information. In addition, the second electronic device 220 may concatenate the third biometric information ABZ and the unique information 1234567 corresponding to the user, and may generate fourth biometric information xysab25 by performing one-way transform with respect to the concatenated information.

In FIG. 16D, the authentication server 230 determines that the fourth biometric information is not authenticated with respect to the second biometric information because the difference between the second biometric information and the fourth biometric information does not fall within the specified range. However, in FIG. 17C, the authentication server 230 may determine that the fourth biometric information is successfully authenticated with respect to the second biometric information because the difference between the second biometric information and the fourth biometric information falls within the specified range. This is because although there is the same difference (or error) between the first biometric information and the third biometric information, the ratio of the biometric information to the whole information is reduced in FIG. 17C in comparison to the case of FIG. 16D. And thus the ratio of the difference (or error) to the whole is reduced. Accordingly, unlike in the case of FIG. 16D, in FIG. 17C, the authentication server 230 may determine that the fourth biometric information is successfully authenticated with respect to the second biometric information.

FIG. 17D illustrates a case in which the difference between the first biometric information and the third biometric information is greater than the difference shown in FIG. 17C. In the cases in FIGS. 17A, 17B, 17C, and 17D, the ratio of the biometric information is small in comparison to the cases of FIGS. 16A, 16B, 16C, and 16D. Therefore, even when the difference between the first biometric information ABC and the third biometric information ADZ is somewhat great, the biometric information may be successfully authenticated as described with reference to FIGS. 16D and 17C. However, in FIG. 17D, the difference between the first biometric information ABC and the third biometric information ADZ is too great even for the embodiment shown in FIG. 17, and thus the difference between the second biometric information xytzm51 and the fourth biometric information xytzm17 may not fall within the specified range. The authentication server 230 may determine that the fourth biometric information is not authenticated with respect to the second biometric information, and may transmit a message indicating that authentication of the fourth biometric information failed to the second electronic device 220.

However, when the first biometric information is ABC and the third biometric information is ADZ, and a third concatenation ratio (for example, 1:9) is used as the concatenation ratio, although this case is not illustrated, the authentication server 230 may determine that the fourth biometric information is successfully authenticated with respect to the second biometric information.

FIG. 18 is a table illustrating a case in which authentication fails when biometric information and unique information are concatenated according to the first concatenation ratio with different users using different devices according to an embodiment of the disclosure.

In an embodiment, the first concatenation ratio may be a ratio of 1:1 at which the first biometric information (or third biometric information) and the unique information corresponding to the user are concatenated.

Unlike the embodiments shown in FIGS. 16A-17D, FIG. 18 illustrates a case in which the unique information corresponding to the user is different in the first electronic device 210 and the second electronic device 220. For example, the SIM card of the first electronic device 210 may correspond to a user A, and the SIM card of the second electronic device 220 may correspond to a user B, and the user A and the user B may not be the same. For example, the user A and the user B may be related, such that the unique information 123 corresponding to the user A and the unique information 124 corresponding to the user B may be similar, but not the same.

In an embodiment, the first electronic device 210 may concatenate the first biometric information ABC and the unique information 123 corresponding to the user A (ABC123). In addition, the second electronic device 220 may concatenate the third biometric information ABD and the unique information 124 corresponding to the user B (ABD124).

In an embodiment, the first electronic device 210 may generate second biometric information az39 by transforming the concatenated information ABC123 in one direction, and the second electronic device 220 may generate fourth biometric information bx71 by transforming the concatenated information ABD124 in one direction. Unlike in the cases shown in FIGS. 16A-17D where the same unique information of the user is concatenated with the biometric information, in the case of FIG. 18, different information is concatenated with the biometric information. Accordingly, the difference between the second biometric information az39 and the fourth biometric information bx71 may be greater than the difference in the biometric information (difference between the first biometric information ABC and the third biometric information ABD). The authentication server 230 may identify that the difference between the second biometric information and the fourth biometric information does not fall within a specified range, and may transmit a message indicating that the authentication failed to the second electronic device.

Figure 19:
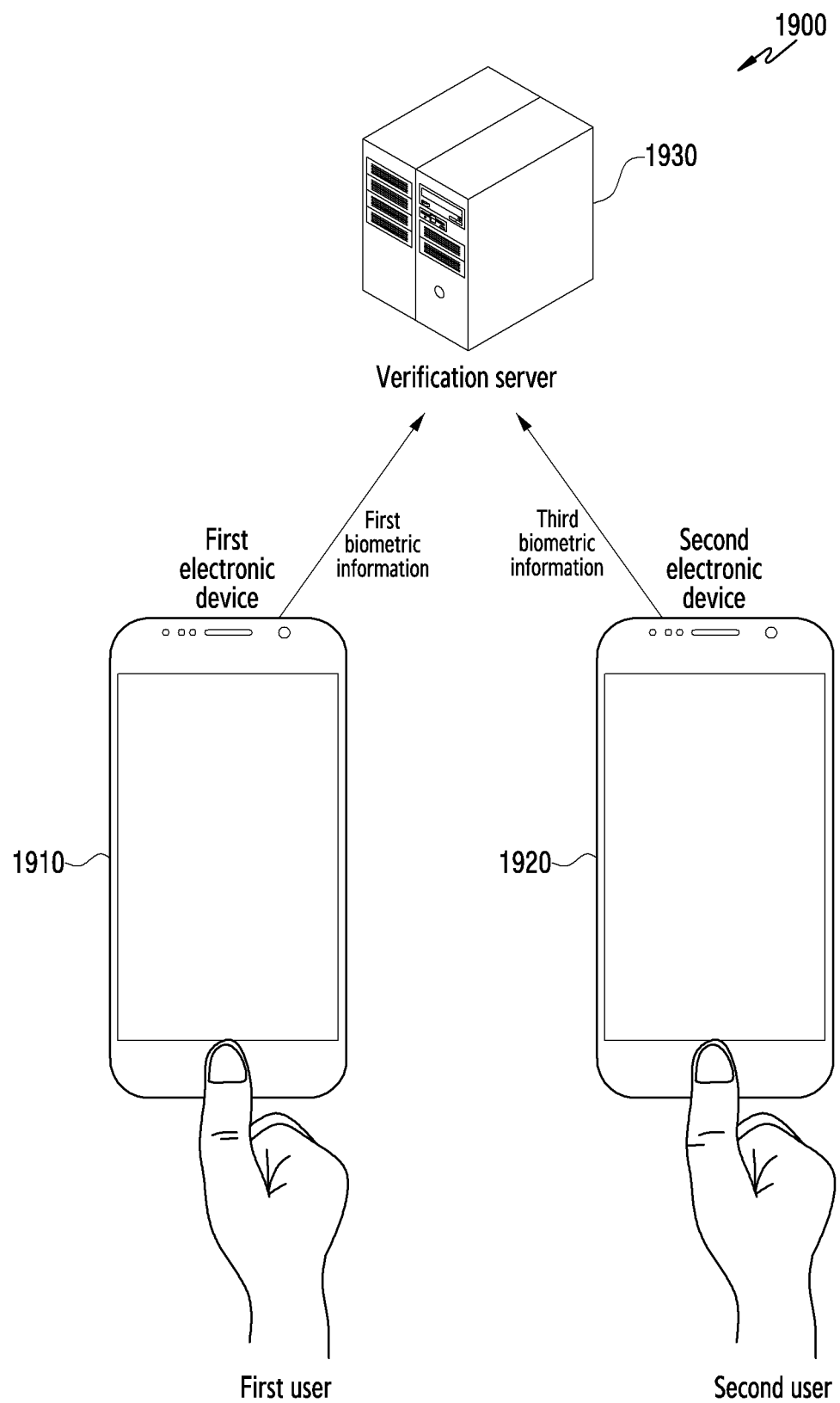
FIG. 19 is a schematic view illustrating a user authentication system using biometric information according to an embodiment of the present disclosure.

FIG. 19 is a schematic view illustrating a user authentication system using biometric information according to an embodiment of the disclosure.

Referring to FIG. 19, the user authentication system 1900 using biometric information may include a first electronic device 1910, a second electronic device 1920, and a verification server 1930.

In an embodiment, the first electronic device 1910 and the second electronic device 1920 may be the electronic device 101 disclosed in FIG. 1.

In an embodiment, the first electronic device 1910 and the second electronic device 1920 may be used by different users. For example, the first electronic device 1910 may register information to be used to verify later-inputted biometric information (hereinafter, referred to as a "reference image") at the verification server 1930 according to an input of a first user. The second electronic device 1920 may receive verification of biometric information from the verification server 1930 according to an input of a second user different from the first user.

In another embodiment, the first electronic device 1910 and the second electronic device 1920 may be electronic devices used by the same user. For example, the first electronic device 1910 and the second electronic device 1920 may be electronic devices which are owned by the same user at a given point in time. For example, the first electronic device may be a smart phone and the second electronic device may be a tablet PC. For example, the first electronic device 1910 may be the first electronic device 210 disclosed in FIG. 2. In another example, the second electronic device 1920 may be the second electronic device 220 disclosed in FIG. 2.

In an embodiment, the first electronic device 1910 and the second electronic device 1920 may be the same electronic device. For example, the first electronic device 1910 and the second electronic device 1920 may be separate components of the same electronic device. For example, the first electronic device 1910 may be an electronic device which transmits biometric information and the reference image to the verification server 1930 and registers the reference image at the verification server 1930, and the second electronic device 1920 may be an electronic device which transmits biometric information to the verification server 1930 and receives verification of the biometric information from the verification server 1930.

In an embodiment, biometric information that the first electronic device 1910 transmits to the verification server 1930 may correspond to the first biometric information described in connection with FIGS. 2-19, and the biometric information that is verified by the verification server 1930 for the second electronic device 1920 may be the third biometric information described in connection with FIGS. 2-18. For example, the biometric information that the first electronic device 1910 transmits to the verification server 1930 may be the first biometric information or biometric information that is generated by deformation of the first biometric information.

In an embodiment, the verification server 1930 may verify biometric information received from a plurality of client devices (for example, the first electronic device 1910, the second electronic device 1920), and may perform various specified functions corresponding to the result of verifying. For example, the verification server 1930 may be the ID server 520 disclosed in FIG. 5.

In an embodiment, the verification server 1930 may verify the first biometric information received from the first electronic device 1910. When the first biometric information is successfully verified, the verification server 1930 may register a reference image received along with the first biometric information by mapping the reference image onto account information or identification information of the electronic device and storing the mapped information in a memory (not shown) of the verification server 1930. Additionally, the verification server 1930 may transmit unique information corresponding to the first user (or feature information extracted from the unique information) to the first electronic device 1910, such that the first electronic device 1910 may concatenate the unique information with the first biometric information.

In an embodiment, the verification server 1930 may verify the third biometric information received from the second electronic device 1920. When the third biometric information is successfully verified, the verification server 1930 may transmit unique information corresponding to the second user to the second electronic device 1920, such that the second electronic device 1920 may concatenate the unique information with the third biometric information.

In an embodiment, the first electronic device 1910 may transmit the reference image to the verification server 1930 along with the biometric information (for example, the first biometric information). In an embodiment, the first biometric information may be biometric information for identifying the first user, such as fingerprint information, an iris image, a face image, or the like. In an embodiment, the reference image may be an image for verifying whether the first user corresponding to the first biometric information (or the second user corresponding to the third biometric image, which may be received later) is indeed the first user or the second user. For example, the reference image may be an image which is obtained by photographing a physical object (for example, a passport, a resident registration certificate in Korea, or a driver's license in U.S.) containing user's identification information. The user's identification information included in the reference image may include biometric identification information and non-biometric identification information. For example, the reference image may include non-biometric identification information such as resident registration numbers in Korea or social security numbers in U.S. In another example, the reference image may include biometric identification information such as fingerprint information or face information.

In an embodiment, the second electronic device 1920 may transmit the third biometric information to the verification server 1930 to receive verification of the biometric information from the verification server 1930. In an embodiment, the third biometric information may be biometric information for identifying a user, such as fingerprint information, an iris image, a face image, or the like, similar to the first biometric information.

The user authentication system 1900 of FIG. 19 may include two verification processes. The user authentication system 1900 may include a first verification process performed at an electronic device end, and a second verification process performed at a server end (or a service end).

In an embodiment, the first electronic device 1910 which registers the reference image at the verification server 1930 by transmitting the first biometric information and the reference image to the verification server 1930 may verify the first biometric information by itself before transmitting the first biometric information and the reference image to the verification server 1930 (first verification process). The first electronic device 1910 may extract biometric information (for example, face information) included in the reference image, and may compare the extracted biometric information with the first biometric information (for example, a selfie image). When the biometric information extracted from the reference image is similar to the first biometric information within a pre-specified value, the first electronic device 1910 may transmit the first biometric information and the reference image to the verification server 1930. The verification server 1930, after receiving the first biometric information and the reference image from the first electronic device 1910, may verify the first biometric information (second verification process). The verification server 1930 may extract biometric information from the received reference image, and may compare the extracted biometric information with the first biometric information. When the extracted biometric information is similar to the first biometric information within a pre-specified value, the verification server 1930 may store the reference image in the memory, and may transmit a message indicating that the registration of the reference image is successfully completed to the first electronic device 1910.

In another embodiment, the second electronic device 1920 which tries to verify biometric information through the verification server 1930 may verify the third biometric information by itself before transmitting the third biometric information to the verification server 1930 (first verification process). The second electronic device 1920 may compare the third biometric information with biometric information stored in a memory of the second electronic device 1920 (for example, the memory 130 disclosed in FIG. 1). The biometric information stored in the memory may be a reference image that is used in the registering process. For example, when the second electronic device 1920 and the first electronic device 1910 are the same electronic device, the biometric information stored in the memory may be a reference image that is used in the registering process. Alternatively, the biometric information stored in the memory may be different from the reference image used in the registering process. For example, the biometric information stored in the memory may be biometric information of the second user and may have nothing to do with the reference image corresponding to the first user, which is used in the registering process. The verification server 1930 may compare the received third biometric information with a reference image stored in the memory of the verification server 1930. The reference image stored in the memory of the verification server 1930 may correspond to the reference image transmitted from the first electronic device 1910. When the third biometric information received by the verification server 1930 is similar to the reference image stored in the memory of the verification server 1930 within a pre-specified value, the verification server 1930 may transmit a message indicating that the verification of the biometric information is successfully completed to the second electronic device 1920. Additionally, the verification server 1930 may transmit unique information corresponding to the second user (or feature information extracted from the unique information) to the second electronic device 1920, such that the second electronic device 1920 may concatenate the unique information with the third biometric information.

Through the embodiment disclosed in FIG. 19, it may be verified whether the user (second user) currently using the second electronic device 1920 corresponds to the user (first user) corresponding to the reference image registered from the first electronic device 1910 through the verification server 1930. For example, when the user corresponding to the reference image registered from the first electronic device 1910 is the first user, and the user currently using the second electronic device 1920 is the second user different from the first user, the verification server 1930 may compare the third biometric information of the second user with the reference image corresponding to the first user. Based on the result of comparing, the verification server 1930 may determine that the user currently using the second electronic device 1920 does not correspond to the user corresponding to the reference image registered from the first electronic device 1910.

Figure 20:
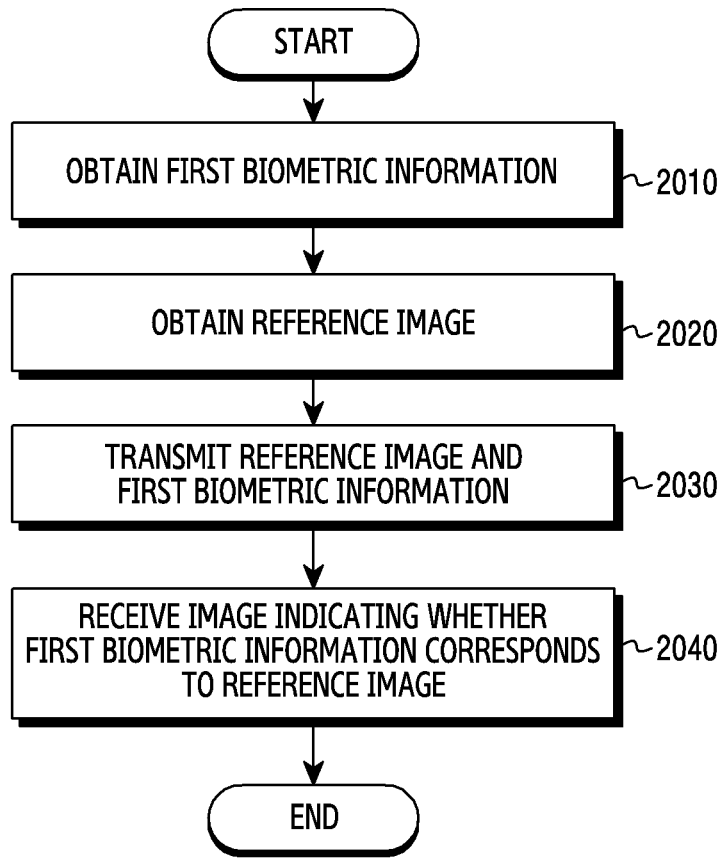
FIG. 20 is flowchart illustrating an operation of registering a reference image at a verification server by the first electronic device according to an embodiment of the present disclosure.

FIG. 20 is a flowchart illustrating an operation of registering a reference image at a verification server by a first electronic device according to an embodiment of the disclosure.

Operations disclosed in FIG. 20 may be performed by the first electronic device (for example, the first electronic device 1910 disclosed in FIG. 19), or a processor of the first electronic device (for example, the processor 120 disclosed in FIG. 3). Hereinafter, it will be described that the operations disclosed in FIG. 20 are performed by the first electronic device 1910.

The operations disclosed in FIG. 20 may correspond to operation 620 of FIG. 6.

In operation 2010, the first electronic device 1910 may obtain first biometric information. In an embodiment, the first electronic device 1910 may obtain the first biometric information in response to an input of a first user requiring biometric authentication for execution of a shopping application. For example, the first electronic device 1910 may obtain a selfie image by using a camera module (for example, the camera module 180 of FIG. 1) as the first biometric information.

In operation 2020, the first electronic device 1910 may obtain a reference image. In an embodiment, the first electronic device 1910 may obtain the reference image in response to the first biometric information being obtained. In an embodiment, the reference image may be an image that is obtained by photographing a physical object containing identification information of the user. The user's identification information included in the reference image may include biometric identification information (for example, fingerprint information, face information) and non-biometric identification information (for example, text information). One reference image may correspond to one user. For example, the first electronic device 1910 may obtain the reference image corresponding to the first user which is the owner of the first electronic device 1910 (e.g. the user corresponding to a SIM card installed at the first electronic device 1910). For example, the first electronic device 1910 may obtain the reference image corresponding to the first user by photographing an ID card of the first user.

In operation 2030, the first electronic device 1910 may transmit the first biometric information and the reference image. In an embodiment, the first electronic device 1910 may transmit the first biometric information and the reference image to a verification server (for example, the verification server 1930 disclosed in FIG. 19) through a communication interface (for example, the wireless communication circuit 310 of FIG. 3).

In an embodiment, the first electronic device 1910 may transmit the first biometric information and the reference image in response to the first biometric information and the reference image being obtained, and may verify the first biometric information by itself, and then, may transmit the first biometric information and the reference image in response to it being identified that the verification is successfully completed.

In an embodiment, instead of transmitting the reference image, the first electronic device 1910 may transmit, to the verification server 1930, information that can perform the same role as the reference image in the verification server 1930. For example, the first electronic device 1910 may transmit information regarding a subscriber identity module installed at the first electronic device 1910 to the verification server 1930, and the verification server 1930 may obtain identification information of the first user (for example, text information, face information, fingerprint information) by using the information related to the subscriber identity module. For example, the verification server 1930 may obtain identification information of the user from an external server (for example, a server included in a government network) by using the information regarding the subscriber identity module.

In an embodiment, the first electronic device 1910 may transmit the first biometric information to the verification server 1930 after transmitting the reference image, or may transmit the first biometric information to the verification server 1930 with the first biometric information. The first electronic device 1910 may transmit the reference image to the verification server 1930 after transmitting the first biometric information although it is not illustrated.

In operation 2040, the first electronic device 1910 may receive a message indicating whether the first biometric information corresponds to the reference image from the verification server 1930. In an embodiment, the verification server 1930 may compare the received first biometric information with biometric information extracted from the received reference image. For example, when the first biometric information is a selfie image of the first user, the verification server 1930 may compare the selfie image with a user image extracted from the received reference image. In another example, when the first biometric information is fingerprint information of the first user, the verification server 1930 may compare the fingerprint information with fingerprint information extracted from the received reference image. When the first biometric information is similar to the extracted biometric information within a pre-specified value, the first electronic device may receive a message indicating that the registration of the reference image is successfully completed from the verification server 1930. In addition, the verification server 1930 may store the reference image in the memory of the verification server 1930. The verification server 1930 may map the reference image onto the account information of the user or the identification information of the first electronic device 1910, and may store the mapped information in the memory of the verification server 1930.

When the registration of the reference image is successfully completed, the first electronic device 1910 may receive information to be concatenated with the first biometric information from the verification server 1930 or another server connected with the verification server 1930, although this operation is not illustrated. For example, the first electronic device 1910 may receive feature information which is extracted from unique information of the first user (for example, unique information of the first user corresponding to the SIM card), and may concatenate the first biometric information and the feature information.

Figure 21:
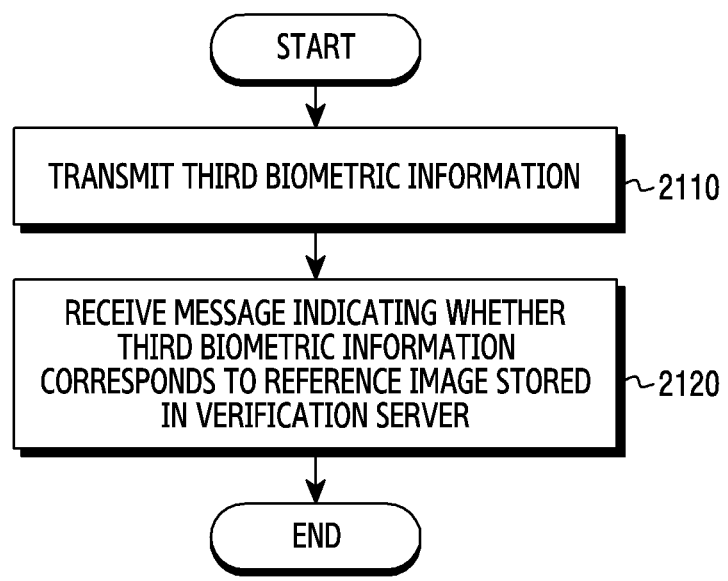
FIG. 21 is a flowchart illustrating an operation of registering biometric information at the verification server by the second electronic device according to an embodiment of the present disclosure.

FIG. 21 is a flowchart illustrating an operation of registering biometric information at a verification server by a second electronic device according to an embodiment of the disclosure.

Operations disclosed in FIG. 21 may be performed by the second electronic device (for example, the second electronic device 1920 disclosed in FIG. 19), or a processor of the second electronic device (for example, the processor 120 disclosed in FIG. 3). Hereinafter, it will be described that the operations disclosed in FIG. 21 are performed by the second electronic device 1920.

The operations disclosed in FIG. 21 may correspond to operation 1103 of FIG. 11.

In operation 2110, the second electronic device 1920 may transmit third biometric information to a verification server (for example, the verification server 1930 of FIG. 19). In an embodiment, the second electronic device 1920 may transmit the third biometric information obtained by using a biometric sensor (for example, the biometric sensor 320 of FIG. 3) to the verification server 1930. In another embodiment, the second electronic device 1920 may transmit the third biometric information obtained by using a camera module (for example, the camera module 180 of FIG. 1) to the verification server 1930. For example, the second electronic device 1920 may transmit a selfie image of the second user obtained by using the camera module 180 to the verification server 1930.

In operation 2120, the second electronic device 1920 may receive a message indicating whether the third biometric information corresponds to a reference image stored in the verification server 1940.

In an embodiment, the second electronic device 1920 may receive a message indicating that the third biometric information corresponds to the reference image stored in the verification server 1930. For example, when the third biometric information is a selfie image of the second user, the verification server 1930 may compare the third biometric information with a user image extracted from the reference image. When the selfie image is similar to the user image extracted from the reference image within a predetermined value, the second electronic device 1920 may receive a message indicating that the third biometric information corresponds to the reference image. In another example, when the third biometric information is fingerprint information of the user, the verification server 1930 may compare the third biometric information with fingerprint information extracted from the reference image. When the fingerprint information included in the third biometric information is similar to the fingerprint information extracted from the reference image within a predetermined value, the second electronic device 1920 may receive a message indicating that the third biometric information corresponds to the reference image.

In another example, the second electronic device 1920 may receive a message (authentication failure message) indicating that the third biometric information does not correspond to the reference image stored in the verification server 1930. For example, the reference image stored in the verification server 1930 may correspond to the first user, and, when the second electronic device 1920 transmits the third biometric information corresponding to the second user different from the first user, the second electronic device 1920 may receive the authentication failure message.

Figure 22A:
FIG. 22A is a view illustrating a user interface of the first electronic device 1910 according to an embodiment of the present disclosure.
Figure 22B:
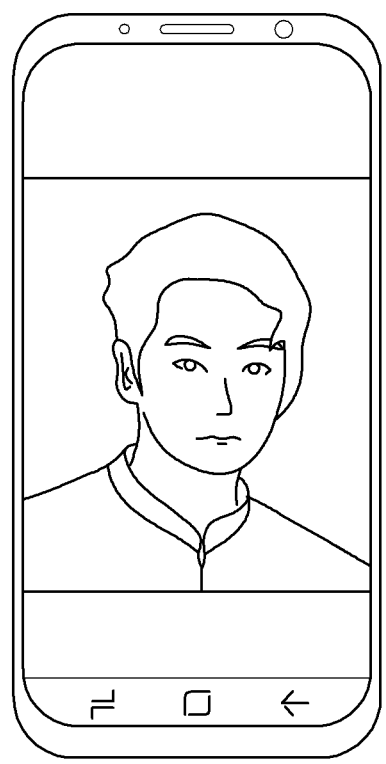
FIG. 22B is a view illustrating a user interface of the first electronic device 1910 according to an embodiment of the present disclosure.
Figure 22C:
FIG. 22C is a view illustrating a user interface of the first electronic device 1910 according to an embodiment of the present disclosure.
Figure 22D:
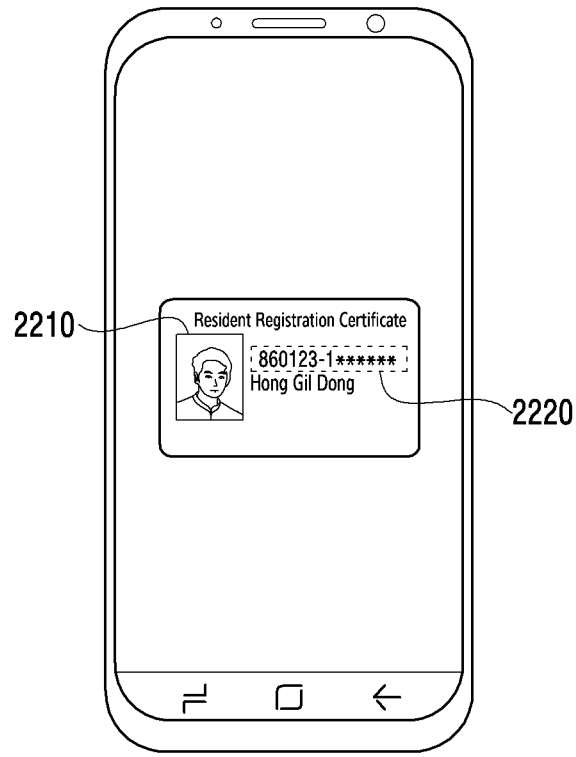
FIG. 22D is a view illustrating a user interface of the first electronic device 1910 according to an embodiment of the present disclosure.

FIG. 22A is a view illustrating a user interface of the first electronic device 1910 according to an embodiment of the disclosure. FIG. 22B is a view illustrating a user interface of the first electronic device 1910 according to an embodiment of the disclosure. FIG. 22C is a view illustrating a user interface of the first electronic device 1910 according to an embodiment of the disclosure. And FIG. 22D is a view illustrating a user interface of the first electronic device 1910 according to an embodiment of the disclosure.

Referring to FIG. 22A, the first electronic device 1910 may display a user interface for obtaining first biometric information according to an input of a user (for example, the first user).

In an embodiment, the first electronic device 1910 may display the user interface for obtaining the first biometric information, in response to an input of the first user requiring biometric authentication for execution of a shopping application. For example, the first electronic device 1910 may display a guidance message saying "Face authentication will start. Please move closer to the camera."

Referring to FIG. 22B, the first electronic device 1910 may obtain the first biometric information. In an embodiment, the first electronic device 1910 may obtain a selfie image of the first user as the first biometric information. The first electronic device 1910 may obtain the selfie image of the first user as device-independent biometric information.

Referring to FIG. 22C, the first electronic device 1910 may display a user interface for obtaining a reference image. For example, the reference image may be an image for verifying whether the first user corresponding to the first biometric information (or a second user corresponding to third biometric information, which is generated later) is indeed the first user or the second user. For example, the reference image may be an image that is obtained by photographing a physical object containing identification information of the user. For example, the first electronic device 1910 may display a guidance message saying "ID card will be registered. Please hold the ID card closer to the camera."

Referring to FIG. 22D, the first electronic device 1910 may obtain a reference image. For example, the first electronic device 1910 may obtain the reference image including biometric identification information 2210 (for example, face information) of the first user, and non-biometric identification information 2220 (for example, a registration number) of the first user. In an embodiment, the obtained reference image may be transmitted to a verification server (for example, the verification server 1930 of FIG. 19).

In an embodiment, the order of the various interfaces shown in FIGS. 22A, 22B, 22C, and 22D may be changed. For example, after the reference image is obtained, the first biometric information (for example, the selfie image) may be obtained. In this case, after obtaining the reference image, the first electronic device 1910 may display a guidance message indicating that the first biometric information is required in order to register the obtained reference image at the verification server 1930.

Figure 23A:
FIG. 23A is a view illustrating a user interface of the second electronic device 1920 according to an embodiment of the present disclosure.
Figure 23B:
FIG. 23B is a view illustrating a user interface of the second electronic device 1920 according to an embodiment of the present disclosure.

FIG. 23A is a view illustrating a user interface of the second electronic device 1920 according to an embodiment of the disclosure. FIG. 23B is a view illustrating a user interface of the second electronic device 1920 according to an embodiment of the disclosure. And FIG. 23C is a view illustrating a user interface of the second electronic device 1920 according to an embodiment of the disclosure.

Referring to FIG. 23A, the second electronic device 1920 may display a user interface for obtaining third biometric information according to an input of a user (for example, the second user). In an embodiment, the second electronic device 1920 may display the user interface for obtaining the third biometric information in response to an input of the second user for executing a shopping application. For example, the second electronic device 1920 may display a guidance message saying "Face authentication is required if you want to execute the shopping application."

Referring to FIG. 23B, the second electronic device 1920 may obtain third biometric information. In an embodiment, the second electronic device 1920 may obtain a selfie image of the second user as the third biometric information. The second electronic device 1920 may obtain the selfie image of the second user as device-independent biometric information.

Figure 23C:
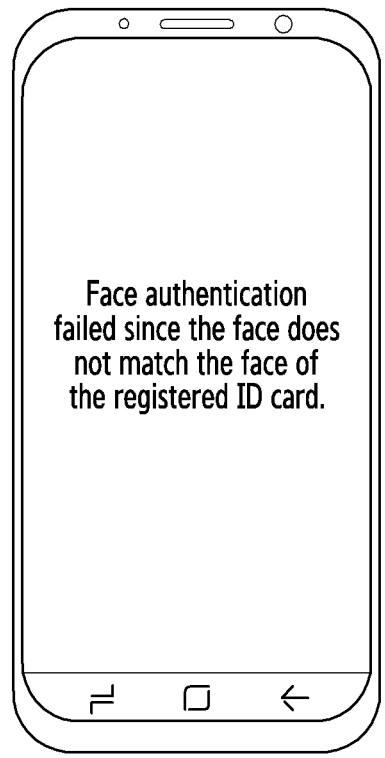
FIG. 23C is a view illustrating a user interface of the second electronic device 1920 according to an embodiment of the present disclosure.

Referring to FIG. 23C, the second electronic device 1920 may display the result of face authentication. In an embodiment, the second electronic device 1920 may transmit the third biometric information to a verification server (for example, the verification server 1930 of FIG. 19), and then may display the result of facial authentication received from the verification server 1930. For example, when the second user and the first user are the same user, the verification server 1930, comparing the third biometric information with the reference image stored in the verification server 1930, may transmit a message indicating that the face authentication is successfully completed to the second electronic device 1920. In another example, when the second user and the first user are different, the verification server 1930 may transmit a message indicating that the face authentication failed to the second electronic device 1920.

According to an embodiment of the present disclosure, an electronic device may include: a communication circuit; a biometric sensor; and a processor operatively connected with the communication circuit and the biometric sensor, and the processor may be configured to: obtain first biometric information of a user by using the biometric sensor; generate second biometric information for authenticating the user, based on concatenation of the first biometric information and unique information corresponding to the user; and transmit the second biometric information to an authentication server through the communication circuit, where the authentication server authenticates fourth biometric information by comparing the fourth biometric information to the second biometric information, and where the fourth biometric information is generated based on concatenation of third biometric information of the user and the unique information.

According to an embodiment, the third biometric information may be obtained at another electronic device.

According to an embodiment, the third biometric information may be different from the first biometric information at least in part.

According to an embodiment, to obtain the first biometric information, the processor may be further configured to receive an input of biometric information from the user through the biometric sensor, and obtain the first biometric information by applying calibration information corresponding to the biometric sensor to the biometric information.

According to an embodiment, the electronic device may further include a memory, and the processor may be further configured to receive the calibration information corresponding to the biometric sensor from an external electronic device, or obtain the calibration information from the memory, based at least on information regarding the biometric sensor or the electronic device.

According to an embodiment, the processor may be further configured to obtain the unique information by using information related to a subscriber identity module installed at the electronic device.

According to an embodiment, the processor may be further configured to obtain the unique information based on information obtained by using at least one sensor of the electronic device.

According to an embodiment, wherein the processor may be further configured to obtain the unique information by using image information related to the user.

According to an embodiment, the image information related to the user may be generated from an image of a physical object photographed using a camera and include biometric information of the user, and the processor may be further configured to transmit the first biometric information and the image information related to the user to a verification server, and to receive unique information corresponding to the user from the verification server.

According to an embodiment, as part of receiving the unique information, the processor may be further configured to receive a message indicating that the first biometric information corresponds to the image information related to the user from the verification server.

According to an embodiment, to generate the second biometric information, the processor may be further configured to concatenate the first biometric information and the unique information at a specified concatenation ratio, and generate the second biometric information by performing one-way transform with respect to the concatenated information.

According to an embodiment, the processor may be further configured to determine the specified concatenation ratio based on a user input for setting a characteristic of biometric authentication.

According to an embodiment, the processor may be further configured to determine the specified concatenation ratio based on at least one of a category, a content, and a pre-set security level of a function related to biometric authentication.

According to an embodiment, an electronic device may include: a communication circuit; a biometric sensor; and a processor operatively connected with the communication circuit and the biometric sensor, and the processor may be configured to: receive a request for execution of a function that requires biometric authentication of a user; obtain first biometric information of the user by using the biometric sensor; generate second biometric information for authenticating the user, based on concatenation of the first biometric information and unique information corresponding to the user; transmit the second biometric information to an authentication server; receive, from the authentication server, a signal indicating that the second biometric information is authenticated with respect to fourth biometric information which is generated based on concatenation of third biometric information of the user and the unique information; and execute the function in response to the signal being received.

According to an embodiment, the third biometric information may be obtained at another electronic device.

According to an embodiment, the processor may be further configured to, in response to the request for execution of the function being received, transmit a signal requesting a service from the authentication server necessary for execution of the function to the authentication server, and the signal requesting the service necessary for execution of the function may include account information of the user.

According to an embodiment, the processor may be further configured to, after transmitting the signal requesting the service necessary for execution of the function, receive, from the authentication server, a signal indicating that biometric authentication is required to be performed before the service is provided.

According to an embodiment, to obtain the first biometric information, the processor may be further configured to receive an input of biometric information from the user through the biometric sensor, and obtain the first biometric information by applying calibration information corresponding to the biometric sensor to the biometric information.

According to an embodiment, the processor may be further configured to obtain the unique information by using information related to a subscriber identity module installed at the electronic device.

According to an embodiment, the processor may be further configured to obtain the unique information by using image information related to the user, and the image information related to the user may be generated from an image of a physical object photographed using a camera and include biometric information of the user, transmit the first biometric information and the image information related to the user to a verification server, and receive the unique information corresponding to the user from the verification server.

According to an embodiment, as part of receiving the unique information, the processor may be further configured to receive a message indicating that the first biometric information corresponds to the image information related to the user.

According to an embodiment, the processor may be further configured to obtain the unique information by using information related to an IP address of the electronic device.

According to an embodiment, to generate the second biometric information, the processor may be further configured to concatenate the first biometric information and the unique information at a specified concatenation ratio, and generate the second biometric information by performing one-way transform with respect to the concatenated information.

According to an embodiment, the processor may be further configured to: receive information regarding a concatenation ratio corresponding to the function from the authentication server, based on the received information, to concatenate the first biometric information and the unique information at the concatenation ratio corresponding to the function, and generate the second biometric information by performing one-way transform with respect to the concatenated information.

According to an embodiment, the processor may be further configured to determine the specified concatenation ratio based on an attribute of a communication network currently connected with the electronic device.

A computer-readable recording medium may include a hard disk, a floppy disk, magnetic media (for example, a magnetic tape), optical media (for example, compact disc read only memory (CD-ROM) and a digital versatile disc (DVD), magneto-optical media (for example, a floptical disk)), or an internal memory. Also, an instruction may include a code generated by a compiler or a code executable by an interpreter. A module or program module according to various embodiments may include one or more of the above-described elements, some element may be omitted, or other element(s) may further be included. According to various embodiments, operations performed by the module, the program, or another component may be carried out sequentially, in parallel, repeatedly, or heuristically, or one or more of the operations may be executed in a different order or omitted, or one or more other operations may be added.

In addition, the embodiments disclosed in the disclosure and the drawings are suggested for easy explanation and understanding of the disclosed technical features, and are not intended to limit the scope of the disclosure. Therefore, the scope of the disclosure should be interpreted as including all changes or modified forms derived based on the technical idea of the disclosure, in addition to the embodiments disclosed herein.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

By concatenating user's biometric information with personal information-based unique information, the false acceptance rate (FAR) of biometric authentication of the user can be reduced. In addition, by adjusting a concatenation ratio between user's biometric information and user's unique information, the FAR and the ratio of authentication by the user can be adjusted.

What is claimed is:

1. An electronic device comprising:
    a communication circuit;
    a biometric sensor; and
    a processor operatively connected with the communication circuit and the biometric sensor, configured to:
        obtain first biometric information of a user by using the biometric sensor;
        reduce distortions of the first biometric information in securing the first biometric information for transmission, by generating second biometric information based on a first concatenation of the first biometric information with non-biometric unique information that is static and corresponding to the user; and
        perform a one-way transformation on the second biometric information, and transmit the one-way transformed second biometric information to an authentication server through the communication circuit for authentication,
    wherein a third biometric information, different from the first biometric information, is concatenated in a second concatenation with the non-biometric unique information corresponding to the user, to generate fourth biometric information stored by the authentication server, and
    wherein the second biometric information is authenticated by the authentication server via comparison against the fourth biometric information, based at least in part on the reduced distortions of the first biometric information via the first concatenation.

2. The electronic device of claim 1, wherein the third biometric information is obtained at another electronic device,
    wherein a first concatenation of the first biometric information with the non-biometric unique information is different from a second concatenation of the third biometric information with the non-biometric unique information,
    wherein the first concatenation is transformed to generate the second biometric information, and the second concatenation is transformed to generate the fourth biometric information, and
    wherein the second biometric information and the fourth biometric information match, and the second biometric information is authenticated by the authentication server.

3. The electronic device of claim 1, wherein a first concatenation of the first biometric information with the non-biometric unique information is different from a second concatenation of the third biometric information with the non-biometric unique information,
    wherein the first concatenation is transformed to generate the second biometric information, and the second concatenation is transformed to generate the fourth biometric information, and
    wherein when the second biometric information and the fourth biometric information fail to match but a difference thereof falls within a predetermined threshold range, the second biometric information is authenticated by the authentication server.

4. The electronic device of claim 1, wherein, to obtain the first biometric information, the processor is further configured to:
    receive an input of biometric information from the user through the biometric sensor; and
    obtain the first biometric information by applying calibration information corresponding to the biometric sensor to the biometric information.

5. The electronic device of claim 4, further comprising a memory, wherein the processor is further configured to:
    receive the calibration information corresponding to the biometric sensor from an external electronic device, based at least on information regarding the biometric sensor or the electronic device; or
    obtain the calibration information from the memory, based at least on the information regarding the biometric sensor or the electronic device.

6. The electronic device of claim 1, wherein the processor is further configured to obtain the non-biometric unique information by using information related to a subscriber identity module installed at the electronic device.

7. The electronic device of claim 1, wherein the processor is further configured to obtain the non-biometric unique information based on information obtained by using at least one sensor of the electronic device.

8. The electronic device of claim 1, wherein the processor is further configured to obtain the non-biometric unique information by using image information related to the user.

9. The electronic device of claim 8, wherein the image information related to the user is generated from an image of a physical object photographed using a camera, and
    wherein the processor is further configured to:
        transmit the first biometric information and the image information related to the user to a verification server; and receive the non-biometric unique information corresponding to the user from the verification server.

10. The electronic device of claim 9, wherein, as part of receiving the non-biometric unique information, the processor is further configured to receive a message indicating that the first biometric information corresponds to the image information related to the user.

11. The electronic device of claim 1, wherein, to generate the second biometric information, the processor is further configured to:
concatenate the first biometric information and the unique information at a specified concatenation ratio.

12. The electronic device of claim 11, wherein the processor is further configured to determine the specified concatenation ratio based on a user input for setting a characteristic of biometric authentication.

13. The electronic device of claim 11, wherein the processor is further configured to determine the specified concatenation ratio based on a category, a content, and/or a pre-set security level of a function related to biometric authentication.

14. The electronic device of claim 1, wherein the processor is further configured to obtain the non-biometric unique information by using information related to an IP address of the electronic device.

15. An electronic device comprising:
a communication circuit;
a biometric sensor; and
a processor operatively connected with the communication circuit and the biometric sensor, configured to:
receive a request for execution of a function that requires biometric authentication of a user;
obtain first biometric information of the user using the biometric sensor;
reduce distortions of the first biometric information in securing the first biometric information for transmission, by generating second biometric information based on a first concatenation of the first biometric information with non-biometric unique information that is static and corresponding to the user; and
perform a one-way transformation on the second biometric information, and transmit the second biometric information to an authentication server for authentication,
wherein a third biometric information, different from the first biometric information, is concatenated in a second concatenation with the non-biometric unique information corresponding to the user to generate fourth biometric information stored by the authentication server, and
wherein the second biometric information is authenticated by the authentication server via comparison against the fourth biometric information, based at least in part on the reduced distortions of the first biometric information in the one-way transformation.

16. The electronic device of claim 15, wherein the third biometric information is obtained at another electronic device,
wherein a first concatenation of the first biometric information with the non-biometric unique information is different from a second concatenation of the third biometric information with the non-biometric unique information, wherein the first concatenation is transformed to generate the second biometric information, and the second concatenation is transformed to generate the fourth biometric information, and
wherein the second biometric information and the fourth biometric information match, and the second biometric information is authenticated by the authentication server.

17. The electronic device of claim 16, wherein the processor is further configured to, in response to the request for execution of the function being received, transmit a signal requesting a service from the authentication server necessary for execution of the function to the authentication server, and
wherein the signal requesting the service necessary for execution of the function includes account information of the user.

18. The electronic device of claim 17, wherein the processor is further configured to, after transmitting the signal requesting the service necessary for execution of the function, receive, from the authentication server, a signal indicating that biometric authentication is required to be performed before the service is provided.

19. The electronic device of claim 15, wherein, to obtain the first biometric information, the processor is further configured to:
receive an input of biometric information from the user through the biometric sensor; and
obtain the first biometric information by applying calibration information corresponding to the biometric sensor to the biometric information.

20. The electronic device of claim 15, wherein the processor is further configured to obtain the unique information by using information related to a subscriber identity module installed at the electronic device.

21. The electronic device of claim 15, wherein, to generate the second biometric information, the processor is further configured to:
concatenate the first biometric information and the unique information at a specified concatenation ratio.

22. The electronic device of claim 21, wherein the processor is further configured to:
determine the specified concatenation ratio based on an attribute of a communication network currently connected with the electronic device.

23. The electronic device of claim 15, wherein the processor is further configured to:
receive information regarding a concatenation ratio corresponding to the function from the authentication server; and
based on the received information, concatenate the first biometric information and the unique information at the concatenation ratio corresponding to the function.

24. The electronic device of claim 15, wherein the processor is further configured to obtain the unique information by using image information related to the user,
wherein the image information related to the user is generated from an image of a physical object photographed using a camera, the image information including biometric information of the user, and
wherein the processor is further configured to:
transmit the first biometric information and the image information related to the user to a verification server; and
receive the unique information corresponding to the user from the verification server.

25. The electronic device of claim 24, wherein, as part of receiving the unique information, the processor is further configured to receive a message indicating that the first biometric information corresponds to the image information related to the user.

* * * * *